United States Patent [19]

Kamada et al.

[11] Patent Number: 5,805,538
[45] Date of Patent: Sep. 8, 1998

[54] METHOD FOR REPRODUCING MULTIPLE OPTICAL RECORDING MEDIUM WITHOUT INTERRUPTION

[75] Inventors: Takashi Kamada, Settushi; Masashi Yamaguchi, Oosakashi; Masaya Miyazaki, Ikedashi, all of Japan

[73] Assignee: Matsushita Electric Industrial Co., Ltd., Japan

[21] Appl. No.: 748,657

[22] Filed: Nov. 14, 1996

[30] Foreign Application Priority Data

Nov. 17, 1995 [JP] Japan .................................. 7-299968
Oct. 17, 1996 [JP] Japan .................................. 8-275013

[51] Int. Cl.$^6$ ............................................... G11B 17/22
[52] U.S. Cl. ............................................ 369/34; 711/111
[58] Field of Search ................... 369/30, 33, 34, 369/36, 38, 40, 178, 32; 707/200; 711/4, 111

[56] References Cited

U.S. PATENT DOCUMENTS

| | | | |
|---|---|---|---|
| 4,899,326 | 2/1990 | Takeya et al. | 369/36 |
| 5,467,326 | 11/1995 | Miyashita et al. | 369/30 |
| 5,559,776 | 9/1996 | Ikenaga | 369/30 |
| 5,568,455 | 10/1996 | Balsom | 369/30 |

*Primary Examiner*—Tan Dinh
*Attorney, Agent, or Firm*—Parkhurst & Wendel

[57] ABSTRACT

A method for reproducing multimedia data in response to plural requests for reproduction using an optical disk library unit having at least one optical disk drive. When a new request for reproduction of multimedia data is given to the optical disk library unit during reproduction of multimedia data recorded over plural optical disks, the new request for reproduction is refused if an optical disk having the multimedia data requested by the new request is the same of one of the plural optical disks having the multimedia data being reproduced.

4 Claims, 31 Drawing Sheets

Fig.5 (a) data structure showing operating state of each optical disk drive

| optical disk drive | optical disk drive number |
| --- | --- |
| operating state | under-reproduction (with optical disk)/stand-by (with optical disk)/stand-by (without optical disk)/malfunction |
| optical disk mounted | optical disk identification number |

Fig.5 (b) data structure showing reproduction order of multimedia data recorded over plural optical disks and storage place of each optical disk

| title | title of multimedia data |
| --- | --- |
| number of optical disks | ○disks |
| order of reproduction | ○th |
| optical disk | optical disk identification number |
| storage place | slot number of storage shelf in optical disk library |

Fig.5 (c) data structure showing time required for reproduction of multimedia data on each optical disk

| title | title of multimedia data |
| --- | --- |
| optical disk | optical disk identification number |
| time required for reproduction | ○hours ○minutes ○seconds |

Fig.7 (a)

data stored in operating state storage means 104

1. Before reproduction

| optical disk drive | Drive0 | Drive1 |
|---|---|---|
| operating state | stand-by (without optical disk) | stand-by (without optical disk) |
| optical disk mounted | — | — |

2. After Step 1

| optical disk drive | Drive0 | Drive1 |
|---|---|---|
| operating state | stand-by (with optical disk) | stand-by (without optical disk) |
| optical disk mounted | disk#0 | — |

3. After Step 9

| optical disk drive | Drive0 | Drive1 |
|---|---|---|
| operating state | under reproduction (with optical disk) | stand-by (with optical disk) |
| optical disk mounted | disk#0 | disk#1 |

4. After Step 8

| optical disk drive | Drive0 | Drive1 |
|---|---|---|
| operating state | stand-by (without optical disk) | under reproduction (with optical disk) |
| optical disk mounted | — | disk#1 |

Fig.7 (b) data stored in reproduction order storage means 105

| title | multi01 | |
|---|---|---|
| number of optical disks | 2 | |
| reproduction order | 1 | 2 |
| optical disk | disk#0 | disk#1 |
| storage place | slot#0 | slot#1 |

Fig.7 (c) data stored in reproduction time storage means 106

| title | multi01 | |
|---|---|---|
| optical disk | disk#0 | disk#1 |
| time required for reproduction | 10 minutes | 10 minutes |

Fig.7 (d) data stored in exchange time storage means 109

| time required for disk exchange | 6 seconds |
|---|---|

Fig.9 (a)

data structure showing reservation state of optical disk drive

| optical disk | optical disk identification number |
|---|---|
| optical disk drive | optical disk drive number |
| reproduction time | ○o'clock ○min ○sec ~ ○o'clock ○min ○sec |
| reservation time | ○o'clock ○min ○sec ~ ○o'clock ○min ○sec |

Fig.9 (b)

data sturcture showing reproduction order of multimedia data recorded over plural optical disks and storage place of each optical disk

| title | title of multimedia data |
|---|---|
| number of optical disks | ○disks |
| order of reproduction | ○th |
| optical disk | optical disk identification number |
| storage place | slot number of storage shelf in optical disk library |

Fig.9 (c)

data structure showinig time required for reproduction of multimedia data on each optical disk

| title | title of multimedia data |
|---|---|
| optical disk | optical disk identification number |
| time required for reproduction | ○hours ○minutes ○seconds |

Fig.11 (a)

data stored in reservation data storage means 108

1. Before reservation of optical disk drive used for reproduction of "multi01"

| optical disk | disk#13 | disk#14 |
|---|---|---|
| optical disk drive | Drive0 | Drive1 |
| reproduction time | 13:00:00 ~13:09:50 | 13:09:50 ~13:19:40 |
| reservation time | 12:59:54 ~13:09:50 | 13:09:44 ~13:19:40 |

2. After reservation of optical disk drive used for reproduction of "multi01"

| optical disk | disk#0 | disk#1 | disk#13 | disk#14 |
|---|---|---|---|---|
| optical disk drive | Drive0 | Drive1 | Drive0 | Drive1 |
| reproduction time | 13:10:00 ~13:20:00 | 13:20:00 ~13:30:00 | 13:00:00 ~13:09:50 | 13:09:50 ~13:19:40 |
| reservation time | 13:09:54 ~13:20:00 | 13:19:54 ~13:30:00 | 12:59:54 ~13:09:50 | 13:09:44 ~13:19:40 |

Fig.11 (b)

data stored in reproduction order storage means 105

| title | multi01 | | multi02 | |
|---|---|---|---|---|
| number of optical disks | 2 | | 2 | |
| reproduction order | 1 | 2 | 1 | 2 |
| optical disk | disk#0 | disk#1 | disk#13 | disk#14 |
| storage place | slot#0 | slot#1 | slot#3 | slot#4 |

Fig.11 (c)

data stored in reproduction time storage means 106

| title | multi01 | | multi02 | |
|---|---|---|---|---|
| optical disk | disk#0 | disk#1 | disk#0 | disk#1 |
| time required for reproduction | 10 minutes | 10 minutes | 9 minutes 50 seconds | 9 minutes 50 seconds |

Fig.11 (d)

data stored in exchange time storage means 109

| time required for disk exchange | 6 seconds |
|---|---|

Fig.17 (a)

data structure stored in data recording position storage means 104

| title | title of multimedia data (file name) |
|---|---|
| optical disk | optical disk identification number |
| recording position | logical block address |
| storage position | slot number of storage shelf 502 in optical disk library unit 500 |

Fig.17 (b)

specific data

| title | multi01 |
|---|---|
| optical disk | disk#1 |
| recording position (logical block address) | 0~8191 (data amount from 0 to 8191 : 4MB) |
| storage position | #10 |
| optical disk | disk#3 |
| recording position (logical block address) | 8192~16383 (data amount from 8192 to 16383 : 4MB) |
| storage position | #12 |

| title | multi02 |
|---|---|
| optical disk | disk#2 |
| recording position (logical block address) | 16384~24575 (data amount from 16384 to 24575 : 4MB) |
| storage position | #11 |
| optical disk | disk#3 |
| recording position (logical block address) | 0~8911 (data amount from 0 to 8911 : 4MB) |
| storage position | #12 |
| optical disk | disk#4 |
| recording position (logical block address) | 0~8911 (data amount from 0 to 8911 : 4MB) |
| storage position | #13 | ordinary reproduction jumpinig reproduction

Fig.21 (a)

data structure stored in recording media storage means 115

| title | title of multimedia data (file name) |
|---|---|
| optical disk | optical disk identification number |

Fig.21 (b)

specific data

| title | multi01 |
|---|---|
| optical disk | disk#1 |
| optical disk | disk#3 |
| title | multi02 |
| optical disk | disk#2 |
| optical disk | disk#3 |
| optical disk | disk#4 |

Fig.23 (a)

data structure stored in reproduction number storage means 118

| title | optical disk identification number |
|---|---|
| reproduction number | reproduction number of multimedia data |

Fig.23 (b)

specific data

| optical disk | disk#1 |
|---|---|
| reproduction number | 1 |
| optical disk | disk#2 |
| reproduction number | 2 |
| optical disk | disk#3 |
| reproduction number | 1 |

Fig.30  Prior Art

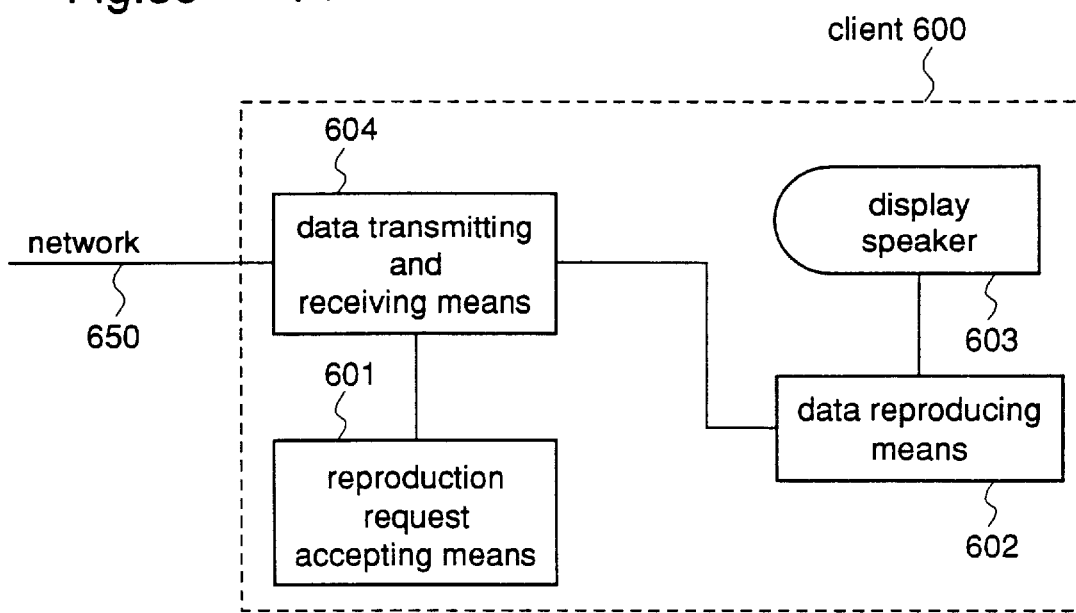

Fig.31 (a)  Prior Art data structure stored in recording content storage means 404

| title | title of multimedia data (file name) |
|---|---|
| optical disk | optical disk identification number |
| recording position | logical block address |
| storage position | slot number of storage shelf 502 in optical disk library unit 500 |

Fig.31 (b)

data stored in recording content storage means

| title | multi05 |
|---|---|
| optical disk | disk#3 |
| recording position | 0~8911 |
| storage position | slot#11 |

METHOD FOR REPRODUCING MULTIPLE OPTICAL RECORDING MEDIUM WITHOUT INTERRUPTION

FIELD OF THE INVENTION

The present invention relates to a method of reproducing multimedia data recorded over plural optical disks, using an optical disk library unit containing an optical disk drive or plural optical disk drives, and a method of reproducing multimedia data in response to plural requests for reproduction, using an optical disk library unit including at least one optical disk drive. The invention also relates to a multimedia server system equipped with an optical disk library unit that deals with plural optical disks using an optical disk drive or plural optical disk drives, in which a server distributes multimedia data recorded in the optical disks to plural clients.

BACKGROUND OF THE INVENTION

In recent years, multimedia server systems have attracted a lot of attention. In a typical multimedia server system, a plurality of multimedia data including, for example, image data, voice data, and character data, are recorded in a storage device and, on a server-client system network, the server reads out the multimedia data from the storage device in response to the client's request and transmits the data to the client wherein the data is reproduced. In such a multimedia server system, when moving image data is transmitted, a sufficiently high transmission speed is required for continuous reproduction of the data. Hence, the storage device is desired to perform high-speed reading and writing of data. However, a high-speed storage device, such as a hard disk, is expensive. Since the multimedia server system needs a mass storage device, such as a RAID using a plurality of hard disks, the price of the system increases significantly. In order to spread the multimedia server system by reducing the price, in recent years, a multimedia server system employing, as a mass storage device, a library unit that deals with plural optical disks, which are less expensive than hard disks, has been developed.

A description is now given of a multimedia server system employing an optical disk library unit, and a method of reproducing multimedia data in the system.

FIG. 27 is a block diagram illustrating a prior art multimedia server system employing an optical disk library unit. In FIG. 27, reference numeral 500 designates an optical disk library unit containing a plurality of optical disks wherein a plurality of multimedia data are recorded. These multimedia data are data including image data and compressed according to a format based on general MPEG method. Reference numeral 400 designates a server, numeral 600 designates clients, and numeral 650 designates a network connecting the server 400 to the clients 600. The server 400 reads multimedia data from the optical disk library unit 500 in response to requests from the clients 600 and distributes the data to the clients 600. The clients 600 request the server 400 to read multimedia data, receive the multimedia data, and reproduce the multimedia data. Reference numeral 550 designates a connection between the optical disk library unit 500 and the server 400, on the basis of SCSI (Small Computer System Interface) standard or the like.

FIG. 28 is a schematic diagram illustrating the structure of the optical disk library unit 500. In FIG. 28, reference numeral 501 designates an optical disk in which multimedia data is recorded, and the recorded multimedia data is processed for a logical block as a unit. Reference numeral 502 designates a storage shelf comprising plural slots, each containing an optical disk. Reference numeral 503 designates an optical disk drive for reading multimedia data from the optical disk 501 or writing multimedia data in the optical disk 501. Reference numeral 504 designates a conveyer for conveying the optical disk 501 between the storage shelf 502 and the optical disk drive 503. Reference numeral 505 designates a controller for controlling the conveyer 504 and the optical disk drive 503 on the instruction of the server 400.

FIG. 29 is a block diagram illustrating the structure of the server 400. In FIG. 29, reference numeral 401 designates a library control means for controlling the optical disk library unit 500 connected to the server 400. Reference numeral 402 designates a control means for controlling reading and transmission of multimedia data in response to the requests of the clients. Reference numeral 403 designates a data transmitting and receiving means for exchanging data with the clients through the network 650. Reference numeral 404 designates a recording content storage means storing a title specifying multimedia data, an optical disk in which the multimedia data is recorded, and a position on the optical disk where the multimedia data is recorded.

FIG. 30 is a block diagram illustrating the structure of the client 600. In FIG. 30, reference numeral 601 designates a reproduction request accepting means for accepting a request for reproduction of multimedia data from a user. Reference numeral 602 designates a data reproducing means for reproducing multimedia data sent from the server 400 and displaying the data on a display unit 603. Reference numeral 604 designates a data transmitting and receiving means for exchanging data or requests with the server 400 through the network 650.

FIG. 31(a) shows the data structure of information stored in the recording content storage means 404 within the server 400. As shown in FIG. 31(a), the recording content storage means 404 stores a title of each multimedia data recorded in an optical disk, information for identifying the optical disk in which the multimedia data having the title is recorded (hereinafter referred to as an identification number of the optical disk), a logical block address showing the position on the optical disk where the multimedia data is recorded, and a slot number showing the position of the optical disk in the storage shelf 502.

FIG. 31(b) shows examples of the stored data. In this case, multimedia data with a title "multi05" is recorded in an optical disk "disk#3" in a position from a logical block 0 to a logical block 8911, and this optical disk is contained in a slot #11 in the library unit.

FIG. 32 is a flowchart for explaining a method for reproducing multimedia data using the prior art multimedia server system.

Initially, in step 1, a user requests reproduction of multimedia data to the reproduction request accepting means 601 in the client 600 by designating the title of the multimedia data, for example, "multi05".

In step 2, the request for reproduction of "multi05" is transmitted from the reproduction request accepting means 601 to the data transmitting and receiving means 604. Further, the request is transmitted through the network 650 to the server 400. In the server 400, the request from the client 600 is received by the data transmitting and receiving means 403, and the control means 402 checks the data in the recording content storage means 404 to find the optical disk having the multimedia data requested by the client 600. More specifically, since the recording content storage means 404 stores the data shown in FIG. 31(b), the control means 402 finds the identification data of the optical disk, the storage position of the optical disk, and the position of the requested data on the optical disk, on the basis of the title "multi05" of the requested multimedia data. In this case, the control means 402 finds that the desired multimedia data "multi05" is recorded in a range from logical block address 0 to logical block address 8911 on the optical disk "disk#3" contained in the slot #11 in the storage shelf.

In step 3, the control means 402 confirms, through the library control means 401, whether the optical disk "disk#3" is mounted in the optical disk drive 503 in the optical disk library unit 500. When the optical disk is not mounted in the drive 503, in step 4, the control means 402 instructs the library control means 401 to convey the optical disk "disk#3" from the slot #11 of the storage shelf 502 to the optical disk drive 503. When the optical disk "disk#3" is already mounted in the optical disk drive 503, the control means 401 proceeds to step 5.

In step 4, the library control means 401 controls the optical disk library unit 500 so that the optical disk "disk#3" in the library unit 500 is conveyed from the storage shelf 502 to the optical disk drive 503. The controller 505 in the optical disk library unit 500 controls the conveyer 504 to take the optical disk "disk#3" from the slot #11 of the storage shelf 502 and insert the optical disk in the optical disk drive 503.

After confirming whether the optical disk "disk#3" is mounted in the drive 503, the control means 402 proceeds to step 5. In step 5, the control means 402 instructs the optical disk library unit 500 to read multimedia data, through the library control means 401, on the basis of the logical block address obtained from the recording content storage means 404. In the optical disk library unit 500, the controller 505 instructs the optical disk drive 503 to read multimedia data from the designated logical block address 0. Then, the server 400 receives the multimedia data read from the optical disk, and the data transmitting and receiving means 403 transmits the multimedia data, through the network 650, to the client 600, followed by step 6.

In step 6, the multimedia data is received by the data transmitting and receiving means 604 in the client 600 and reproduced by the data reproducing means 602.

Next, in step 7, it is judged whether all the data recorded in the logical block addresses 0~8911 are reproduced. When the reproduction is not completed yet, the above-mentioned reading, transmission, and reproduction of the multimedia data are repeated.

In the method for reproducing multimedia data using the prior art network system, when the multimedia data requested by the client is recorded in a single optical disk, this data can be continuously output from the server and continuously reproduced in the client. However, if the requested multimedia data is recorded over plural optical disks, reading and transmission of this data are not performed when the optical disks are exchanged. Consequently, reproduction of the data is unfavorably interrupted due to the exchange of the optical disks.

As described above, the optical disk library unit can store a mass of multimedia data at a relatively low cost. However, in many cases, multimedia data, such as image and voice, is recorded over plural optical disks. Hence, such an interruption in reproduction of multimedia data is an undesirable matter for the multimedia server system.

A description is now given of a case where plural clients request for reproduction of multimedia data from a single optical disk at the same time. It is assumed that two lines of MPEG1 data respectively recorded on an outer circumference and an inner circumference of an optical disk are reproduced using an optical disk drive having the following performances: maximum seek time of about 750 msec; maximum rotation waiting time of about 30 ms; effective transmission rate in a range from 520 KBytes/sec (inner circumference) to 1150 KBytes/sec (outer circumference).

In order to reproduce the two data lines continuously, data of 187 KBytes/sec must be read out from both the inner circumference and the outer circumference. The maximum time required for the reading is calculated as follows:

$$\text{data reading time} = \text{rotation waiting time} * 2 + \text{inner circumference data transmission time} + \text{outer circumference data transmission time} + \text{seeking time} = 30 * 2 + 187/520*1024 + 187/1150*1024 + 750 \text{ (ms)} = 1344 \text{ (ms)} = 1.3 \text{ (s)}$$

Since the data reading time exceeds one second, it is not possible to read out data at a sufficient speed for continuous reproduction. That is, in this case, reproduction of multimedia data is interrupted. As mentioned above, the possibility of reproduction in response to plural requests from plural clients to a single recording medium depends on the recording medium and the performance of the device processing the recording medium, i.e., it depends on the speed of reading or writing data on the recording medium. Therefore, when plural clients request, at the same time, reproduction of multimedia data recorded in a high-speed storage device, such as a hard disk (magnetic disk), the storage device can deal with the requests. However, when an optical disk drive having a relatively low data reading speed is employed, if the clients' requests for reproduction of data concentrate on a single optical disk, the reproduction is unfavorably interrupted as described above.

SUMMARY OF THE INVENTION

An object of the present invention is to provide a method for continuously reproducing multimedia data recorded over plural optical disks.

Another object of the present invention is to provide a method for reproducing multimedia data, that can avoid unwanted interruption in reproduction when plural requests for reproduction of multimedia data are received, by checking the requests given to multimedia data recorded on the same optical disk and refusing the request that exceeds the performance of the optical disk drive.

Still another object of the present invention is to provide a multimedia server system that can continuously distribute multimedia data recorded over plural optical disks, to clients, by a server equipped with an optical disk library unit.

A further object of the present invention is to provide a multimedia server system that can avoid unwanted interruption in reproduction when plural requests for reproduction are received, by checking whether or not the requests concentrate on the same optical disk to exceed the performance of the optical disk drive.

Other objects and advantages of the invention will become apparent from the detailed description that follows. The detailed description and specific embodiments described are provided only for illustration since various additions and modifications within the scope of the invention will be apparent to those of skill in the art from the detailed description.

According to a first aspect of the present invention, in a method for reproducing multimedia data recorded over plural optical disks, using an optical disk library unit having at least two, first and second, optical disk drives; multimedia data recorded in one of the optical disks is read and reproduced in the first optical disk drive and, during the reading and reproduction, a next optical disk is mounted in the second optical disk drive; and reading and reproduction of multimedia data recorded in the next optical disk mounted in the second optical disk drive are started immediately after the reading of the multimedia data recorded in the optical disk in the first optical disk drive is completed. Therefore, it is possible to continuously reproduce the multimedia data without interruption due to exchange of the optical disks.

According to a second aspect of the present invention, in the above-mentioned method, the order of the plural optical disks to reproduce the multimedia data from the optical disks, and a time required for the reproduction of the multimedia data from each optical disk are stored; the operating state of each optical disk drive in the optical disk library unit is stored; the multimedia data recorded in the optical disk in the first optical disk drive is read and reproduced; during the reading and reproduction, the next optical disk is mounted, according to the stored reproduction order, in the second optical disk drive that is judged as usable on the basis of the stored operating state of the second optical disk drive, when the remaining reproduction time of the optical disk in the first optical disk drive, which time is obtained by subtracting the time taken by the reproduction from the stored time required for the reproduction, is longer than the time required for exchange of optical disks; and reading and reproduction of the multimedia data recorded in the next optical disk mounted in the second optical disk drive are started immediately after the reading of the multimedia data recorded in the optical disk in the first optical disk drive is completed.

According to a third aspect of the present invention, in the above-mentioned method, the order of the plural optical disks to reproduce the multimedia data from the optical disks is stored; for each optical disk, an optical disk drive used for reading and reproduction of the multimedia data from the optical disk, and a period of time the optical disk drive is used are decided and stored as reservation data; and the optical disk is mounted in the optical disk drive according to the stored reproduction order and the reservation data when the present time reaches the decided time and, thereafter, the multimedia data is read and reproduced from the optical disk.

According to a fourth aspect of the present invention, in a method for reproducing multimedia data recorded over plural optical disks, using an optical disk library unit having at least one optical disk drive; during reading and reproduction of the multimedia data recorded in one of the optical disks, the multimedia data from the optical disk is prefetched by an amount larger than an amount equivalent to the time required for exchange of the optical disks, and the prefetched data is temporarily stored; and the multimedia data stored temporarily is read and reproduced when the optical disk is exchanged for the next optical disk. Therefore, it is possible to continuously reproduce the multimedia data without interruption due to exchange of the optical disks.

According to a fifth aspect of the present invention, in the above-described method, the order of the plural optical disks to reproduce the multimedia data from the optical disks, and a time required for the reproduction of the multimedia data from each optical disk are stored; the multimedia data is read and reproduced from one of the optical disks in the optical disk drive and, at the same time, the multimedia data is prefetched from the optical disk by an amount larger than an amount equivalent to the time required for exchange of the optical disks, and the prefetched data is stored temporarily; the multimedia data stored temporarily is read and reproduced and, at the same time, the next optical disk is mounted in the optical disk drive according to the stored reproduction order, when the remaining reproduction time of the optical disk, which time is obtained by subtracting the time taken by the reproduction from the stored time required for the reproduction, becomes shorter than the time required for exchange of optical disks; and reading and reproduction of the multimedia data from the next optical disk is started immediately after the reading of the multimedia data stored temporarily is completed.

According to a sixth aspect of the present invention, in the above-described method, the order of the plural optical disks to reproduce the multimedia data from the optical disks, and a time required for the reproduction of the multimedia data from each optical disk are stored; one of the optical disks is mounted in the optical disk drive, and a prefetching speed for prefetching the multimedia data from the optical disk, which speed enables a prefetching within a time range obtained, is calculated by subtracting the time required for exchange of the optical disks from the stored time required for reproduction; the multimedia data is prefetched from the optical disk at the calculated speed and temporarily stored and, thereafter, the multimedia data stored temporarily is read and reproduced; the next optical disk is mounted in the optical disk drive according to the stored reproduction order, during the reading and reproduction of the multimedia data stored temporarily, when the remaining reproduction time of the optical disk, which time is obtained by subtracting the time taken by the reproduction from the stored time required for the reproduction, becomes shorter than the time required for exchange of optical disks; and reading and reproduction of the multimedia data from the next optical disk are started immediately after the reading of the multimedia data stored temporarily is completed.

According to a seventh aspect of the present invention, in the above-described method, the order of the plural optical disks to reproduce the multimedia data from the optical disks is stored; before the reading and reproduction of the multimedia data from one of the optical disks, a prefetching start position of the optical disk is calculated, which position enables prefetching of the multimedia data by an amount larger than an amount equivalent to the time required for exchange of the optical disks, during the reading and reproduction; the multimedia data is read and reproduced from the optical disk in the optical disk drive and, when the recording position on the optical disk reaches the prefetching start position, the multimedia data is prefetched from the prefetching start position and then stored temporarily; reading and reproduction of the multimedia data stored temporarily are started when the prefetching of the multimedia data recorded in the optical disk is completed and, during the reading and reproduction, the next optical disk is mounted in the optical disk drive according to the stored reproduction order; and reading and reproduction of the multimedia data from the next optical disk are started immediately after the reading of the multimedia data stored temporarily is completed.

According to an eighth aspect of the present invention, in the above-described method, when the reproduction of multimedia data is performed according to a request for reproduction designating a reproduction start position and the reproduction start position is, as a recording position on the optical disk, after the prefetching start position, multimedia data recorded between the prefetching start position and the reproduction start position are prefetched and stored temporarily, in advance of reading and reproduction according to the request. Therefore, unwanted interruption in the reproduction due to shortage of the multimedia data temporarily stored is avoided, and a request for reproduction in a wider range can be accepted.

According to a ninth aspect of the present invention, in the above-described method, during reading of the multimedia data from the optical disk in the optical disk drive, the next optical disk is moved to a storage place nearest to the optical disk drive in the optical disk library unit. In this method, since the time required for exchange of the optical disks is reduced, the amount of the multimedia data stored temporarily is reduced, resulting in a reduction in power consumption of a storage unit used for the temporary storage. Therefore, unwanted interruption in the reproduction due to exchange of the optical disks is avoided with less hardware resources.

According to a tenth aspect of the present invention, in a method for reproducing multimedia data in response to plural requests for reproduction of multimedia data, using an optical disk library unit having at least one optical disk drive, when a new request for reproduction of multimedia data is given to the optical disk library unit during reproduction of multimedia data recorded over plural optical disks, this new request for reproduction is refused if an optical disk having the multimedia data requested by the new request is the same as one of the plural optical disks having the multimedia data being reproduced. Therefore, unwanted interruption in the reproduction due to a request for reproduction that exceeds the ability of the optical disk is avoided.

According to an eleventh aspect of the present invention, in a method for reproducing multimedia data in response to plural requests for reproduction using an optical disk library unit having at least one optical disk drive, the method; an upper limit of the number of multimedia data that can be reproduced simultaneously from a single optical disk is stored; a reproduction number for each optical disk contained in the optical disk library unit is stored, which reproduction number is the sum of the number of multimedia data being reproduced from the optical disk and the number of multimedia data to be reproduced later from the optical disk; and when a request for reproduction of multimedia data is given to the optical disk library unit, this request is refused if the number obtained by adding 1 to the reproduction number of the optical disk having the requested multimedia data exceeds the upper limit number. Therefore, unwanted interruption in the reproduction due to a request for reproduction that exceeds the ability of the optical disk is avoided.

According to a twelfth aspect of the present invention, a multimedia server system comprises an optical disk library unit wherein multimedia data recorded in plural optical disks are processed with at least two, first and second, optical disk drives, and a server for distributing the multimedia data recorded in the optical disks to plural clients, and this system is characterized by a reproduction order storage means for storing the order of the plural optical disks to reproduce the multimedia data from the optical disks, and storing storage places of the optical disks in the optical disk library unit; an operating state storage means for storing the operating state of each optical disk drive; and a control means for controlling reading of multimedia data from the optical disk library unit and distribution of the multimedia data to the clients, in response to requests for reproduction of multimedia data from the clients. In this system, when multimedia data recorded over some of the optical disks is requested, during reading and reproduction of the requested multimedia data from one of the optical disks mounted in the first optical disk drive, the control means takes the next optical disk having the requested data from the storage place according to the content of the reproduction order storage means. Then, the control means mounts the next optical disk in the second optical disk drive that is judged as usable according to content of the operating state storage means, and starts reading and reproduction of multimedia data from the next optical disk immediately after the reading from the optical disk in the first optical disk drive is completed. Therefore, it is possible to continuously reproduce the multimedia data without interruption due to exchange of the optical disks.

According to a thirteenth aspect of the present invention, a multimedia server system comprises an optical disk library unit wherein multimedia data recorded in plural optical disks are processed with at least two, first and second, optical disk drives, and a server for distributing the multimedia data recorded in the optical disks to plural clients, and the system is characterized by a reproduction order storage means for storing the order of the plural optical disks to reproduce the multimedia data from the optical disks, and storing storage places of the optical disks in the optical disk library unit; a reproduction time storage means for storing the time required for reproduction of multimedia data from each optical disk; an exchange time storage means for storing the time required for exchange of the optical disks; a reservation data storage means for storing, for each optical disk having multimedia data requested by the client, an optical disk drive to be used for reproduction of the requested data, and the reservation time obtained by adding the time required for exchange the optical disks to the time required for the reproduction; and a control means for controlling reading of multimedia data from the optical disk library unit and distribution of the multimedia data to the clients, in response to requests for reproduction of multimedia data from the clients. In this system, when a request for reproduction of multimedia data is given to the control means, the control means updates the contents of the reservation data storage means according to the request, referring to the contents of the reproduction order storage means, the reproduction time storage means, the exchange time storage means, and the reservation data storage means, and then the control means controls mounting of the optical disk having the requested data and reading and reproduction of the requested data. Therefore, unwanted interruption in the reproduction due to exchange of the optical disks is avoided, and the optical disk drive can be used with high efficiency in response to the requests from plural clients.

According to a fourteenth aspect of the present invention, a multimedia server system comprises an optical disk library unit wherein multimedia data recorded in plural optical disks are processed with at least one optical disk drive, and a server for distributing the multimedia data recorded in the optical disks to plural clients, the system is characterized by an exchange time storage means for storing the time required for exchange of the optical disks in the optical disk library unit; a reproduction order storage means for storing the order of the plural optical disks to reproduce the multimedia data from the optical disks, and storing storage places of the optical disks in the optical disk library unit; a reproduction time storage means for storing the time required for reproduction of multimedia data from each optical disk; a reproduction time measuring means for measuring the time during which reproduction of the multimedia data is performed; a temporary storage means for temporarily storing multimedia data read from the optical disk; and a control means for controlling reading of multimedia data from the optical disk library unit and distribution of the multimedia data to the clients, in response to requests for reproduction of multimedia data from the clients. In this system, when multimedia data recorded over plural optical disks is requested, the control means reads multimedia data by an amount larger than an amount equivalent to the content of the exchange time storage means and stores the data in the temporary storage means, during reading and reproduction of the multimedia data from one of the optical disks. When the remaining reproduction time of the optical disk, which is calculated from the content of the reproduction time storage means and the result of measurement by the reproduction time measuring means, becomes lower than the content of the exchange time storage means, the control means controls exchange of the optical disks according to the content of the reproduction order storage means, during reading and reproduction of the temporarily stored multimedia data. Therefore, it is possible to continuously reproduce the multimedia data without interruption due to exchange of the optical disks.

According to a fifteenth aspect of the present invention, a multimedia server system comprises an optical disk library unit wherein multimedia data recorded in plural optical disks are processed with at least one optical disk drive, and a server for distributing the multimedia data recorded in the optical disks to plural clients, and this system is characterized by an exchange time storage means for storing the time required for exchange of the optical disks within the optical disk library unit; a data recording position storage means for storing positions where the multimedia data are recorded in the optical disks; a reading speed storage means for storing a possible reading speed of the optical disk drive; a reproducing speed storage means for storing a reading speed required for reproduction of the multimedia data; a temporary storage means for temporarily storing the multimedia data read from the optical disks; a control means for controlling reading of multimedia data from the optical disk library unit and distribution of the multimedia data to the clients, in response to requests for reproduction of multimedia data from the clients. In this system, when multimedia data recorded over some of the optical disks is requested, the control means calculates a prefetching start position on the basis of the contents of the exchange time storage means, the data recording position storage means, the reading speed storage means, and the reproducing speed storage means, in advance of reading and reproduction of the requested data from the optical disks. Then, the control means controls prefetching of the multimedia data from the prefetching start position and storage of the prefetched data in the temporary storage means, during reading and reproduction of the multimedia data. Then, the control means controls reading and reproduction of the multimedia data stored in the temporary storage means when the optical disk in the disk drive is exchanged for another optical disk. Therefore, it is possible to continuously reproduce the multimedia data without interruption due to exchange of the optical disks.

According to a sixteenth aspect of the present invention, a multimedia server system comprises an optical disk library unit wherein multimedia data recorded in plural optical disks are processed with at least one optical disk drive, and a server for distributing the multimedia data recorded in the optical disks to plural clients, the system is characterized by a recording media storage means for storing, for each multimedia data, an identification data that shows an optical disk in which the multimedia data is recorded; an identification data comparing means for comparing the identification data of the plural optical disks with each other; and a control means for accepting or refusing a request for reproduction of multimedia data from the client, on the basis of the result of the comparison by the identification data comparing means. Since the data transmitting ability of the system is compared with the data transmitting speed required for continuous reproduction and a request for reproduction that exceeds the ability is refused, unwanted interruption in the reproduction is avoided.

According to a seventeenth aspect of the present invention, a multimedia server system comprises an optical disk library unit wherein multimedia data recorded in plural optical disks are processed with at least one optical disk drive, and a server for distributing the multimedia data recorded in the optical disks to plural clients, the system is characterized by a reproducible data number storage means for storing an upper limit of the number of multimedia data that can be reproduced simultaneously from each optical disk; a reproduction number storage means for storing a reproduction number of each optical disk, which reproduction number is the sum of the number of multimedia data being reproduced from the optical disk and the number of multimedia data to be reproduced later from the optical disk; and a control means for accepting or refusing a request for reproduction of multimedia data from the client, on the basis of the contents of the reproducible data number storage means and the reproduction number storage means. Since the data transmitting ability of the system is compared with the data transmitting speed required for continuous reproduction and a request for reproduction that exceeds the ability is refused, unwanted interruption in the reproduction is avoided.

According to an eighteenth aspect of the present invention, the above-described multimedia server system further comprises a recording media storage means for storing, for each multimedia data, an identification data that shows an optical disk in which the multimedia data is recorded; and an identification data comparing means for comparing the identification data of the plural optical disks with each other; and the control means accepts or refuses the request for reproduction of multimedia data from the client, on the basis of the result of the comparison by the identification data comparing means.

According to a nineteenth aspect of the present invention, the above-described multimedia server system further comprises a reproducible data number storage means for storing an upper limit of the number of multimedia data that can be reproduced simultaneously from each optical disk; and a reproduction number storage means for storing a reproduction number of each optical disk, which reproduction number is the sum of the number of multimedia data being reproduced from the optical disk and the number of multimedia data to be reproduced later from the optical disk; and the control means accepts or refuses the request for reproduction of multimedia data from the client, on the basis of the contents of the reproducible data number storage means and the reproduction number storage means.

BRIEF DESCRIPTION OF THE DRAWINGS

FIGS. 5(a)–5(c) are tables showing data structures stored in storage means in the server unit according to the first embodiment of the invention.

FIGS. 7(a)–7(d) are tables illustrating specific data stored in the storage means in the server unit according to the first embodiment of the invention.

FIGS. 9(a)–9(c) are tables showing data structures stored in storage means in the server unit according to the second embodiment of the invention.

FIGS. 11(a)–11(d) are tables illustrating specific data stored in the storage means in the server unit according to the second embodiment of the invention.

FIG. 17(a) is a table showing a data structure stored in a storage means in the server unit according to the sixth embodiment, and FIG. 17(b) is a table showing specific data stored in the storage means.

FIGS. 21(a) is a table showing a data structure stored in a storage means in the server unit according to the eighth embodiment of the invention, and FIG. 21(b) is a table showing specific data stored in the storage means.

FIG. 23(a) is a table showing a data structure stored in a storage means in the server unit according to the ninth embodiment of the invention, and FIG. 23(b) is a table showing specific data stored in the storage means.

FIG. 30 is a block diagram illustrating a client according to the prior art.

FIG. 31(a) is a table showing a data structure stored in a storage means in the prior art server unit, and FIG. 31(b) is a table showing specific data stored in the storage means.

DETAILED DESCRIPTION OF THE PREFERRED EMBODIMENTS

[Embodiment 1]

In a multimedia server system according to a first embodiment of the invention, when multimedia data recorded over plural optical disks is reproduced successively, in advance of exchange of the optical disks, the next optical disk is mounted in a disk drive.

Figure 1:
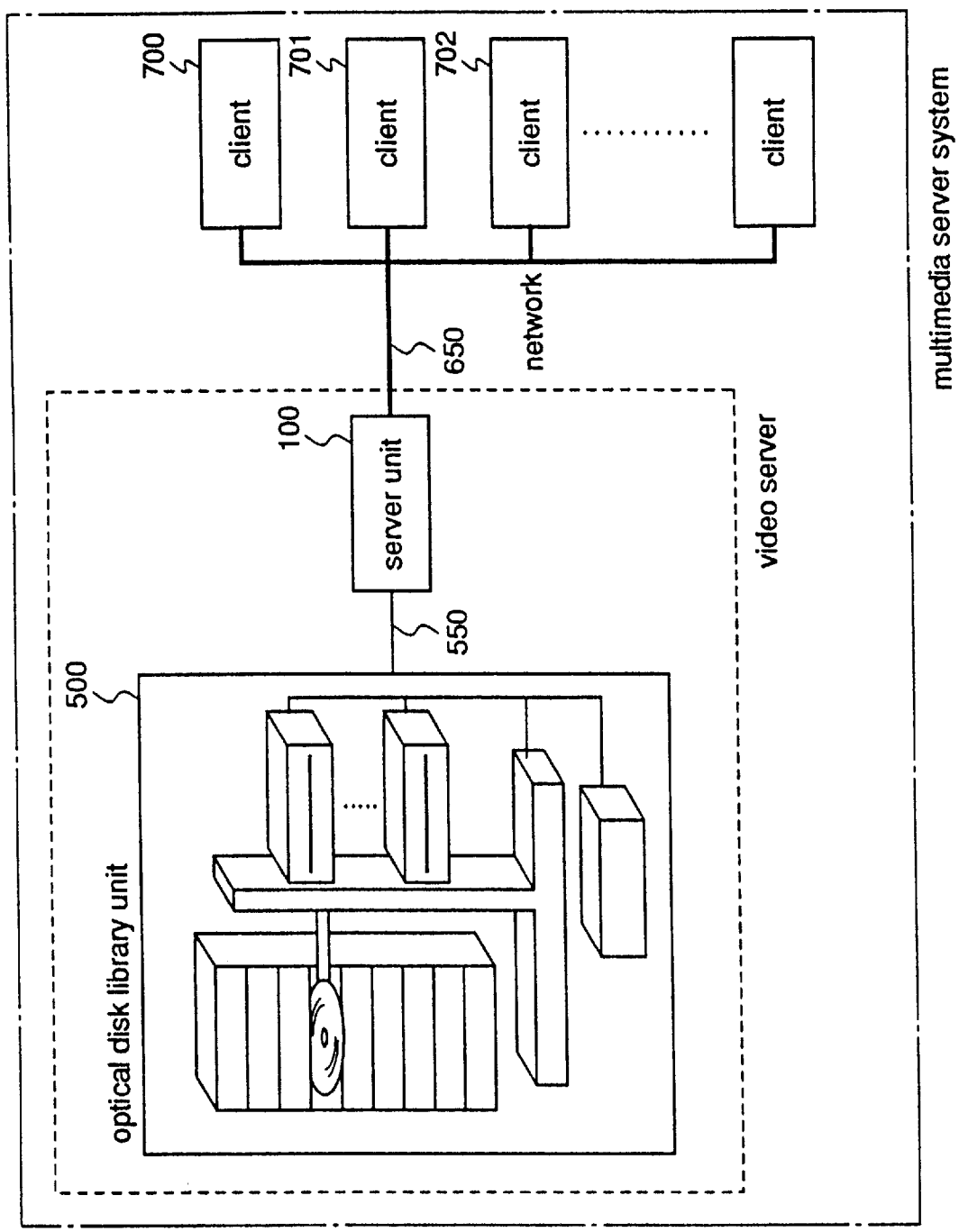
FIG. 1 is a block diagram illustrating a multimedia server system according to a first embodiment of the invention.
Figure 28:
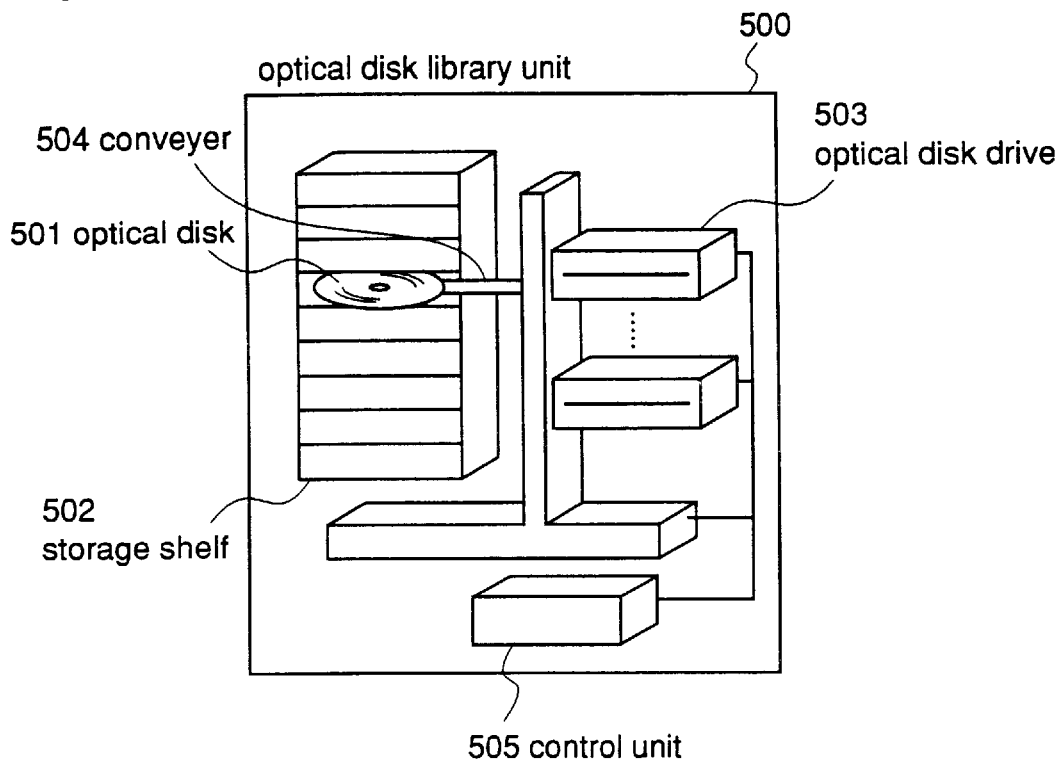
FIG. 28 is a schematic diagram illustrating an optical disk library unit included in the prior art multimedia server system.
Figure 29:
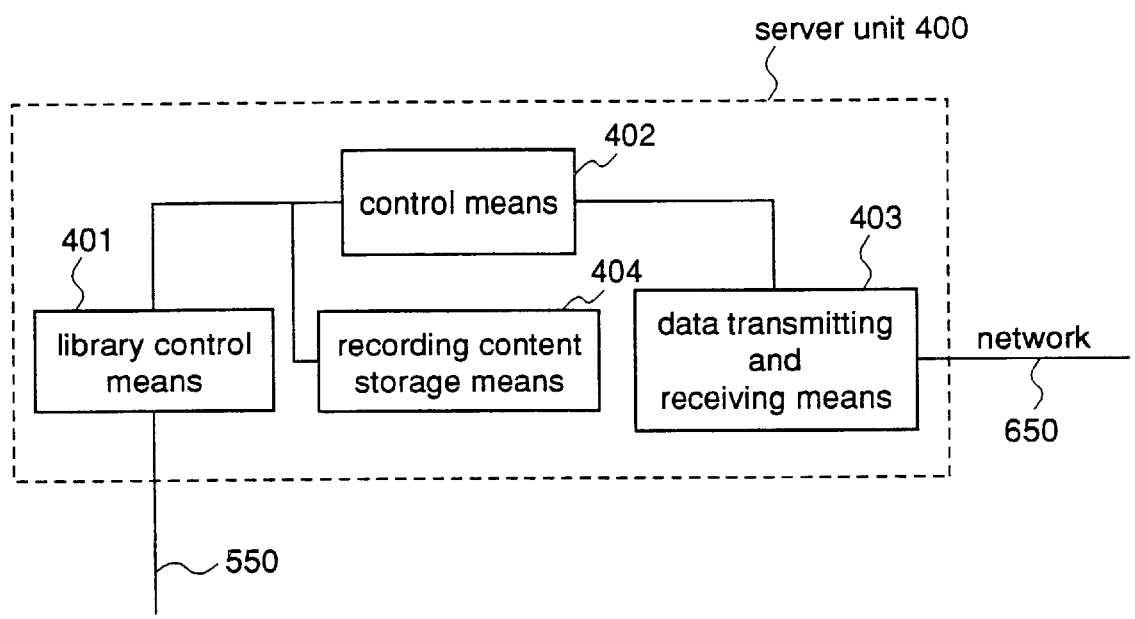
FIG. 29 is a block diagram illustrating a server unit according to the prior art.
Figure 32:
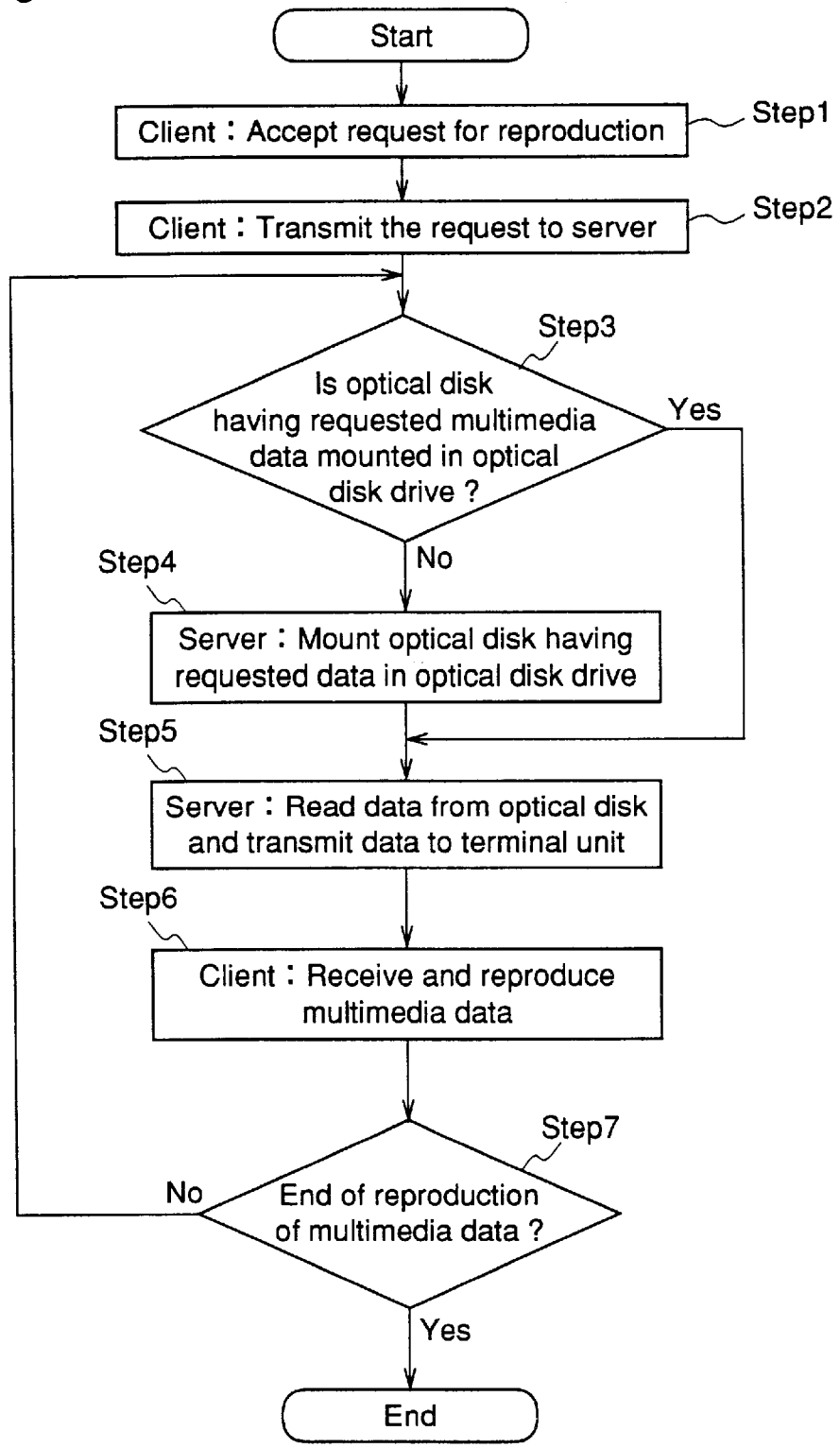
FIG. 32 is a flowchart showing the operation of the prior art multimedia server system.

FIG. 1 is a block diagram illustrating a multimedia server system according to the first embodiment of the invention. Since functions of an optical disk library unit 500, a server unit 100, clients 700, 701, 702, . . . , a network 650, and a connection 550 shown in FIG. 1 are identical to those already described for the prior art system, repeated description is not necessary. In this system, the server unit 100 and the optical disk library unit 500 serve as a video server that distributes multimedia data to plural clients through the network 650. The structure of the library unit 500 is the same as the prior art library unit shown in FIG. 28.

FIG. 2(a) is a block diagram illustrating the hardware structure of the video server comprising the server unit and the optical disk library unit. In the figure, reference numeral 201 designates an input/output unit (hereinafter referred to as I/O unit) for inputting various set points and outputting the operating state of the video server, such as "under operation" or "malfunction". The I/O unit 201 is implemented by an input means, such as a keyboard or a mouse, and an output means, such as a display unit. Reference numeral 202 designates a real time clock to know the time in the video server. A network I/F 203 is a circuit for controlling transmission and reception of data through the network. A CPU (Central Processing Unit) 204 executes an operating system (OS) of the video server, and a control program for reproduction of multimedia data. A main storage unit 205 stores the operating system of the video server, the control program for reproduction of multimedia data, and data used for the control. A disk I/F 206 is a disk control circuit for directing a magnetic disk drive 207 and the optical disk library unit 500 to read or write data, according the SCSI standard or the like. The magnetic disk drive 207 is used for recording the operating system of the video server and the control program for reproduction of multimedia data, and for saving the data stored in the main storage unit 205.

FIG. 2(b) is a block diagram illustrating a hardware structure of a client. A display unit 208 shows multimedia data, and a speaker is used as the display unit when voice data is included. A display I/F 209 is a circuit for controlling the display of multimedia data on the display unit 208. A user inputs a request for reproduction of desired multimedia data to the client, using an input unit 210, such as a keyboard or a mouse. An MPEG decoder 211 expands multimedia data compressed by MPEG so that the data can be displayed on the display unit 208. A network I/F 212 is a circuit for controlling transmission and reception of data through the network. A CPU 213 executes an operating system (OS) of the client and a control program for reproduction of multimedia data. Main storage unit 214 stores the operating system of the client and the control program for reproduction of multimedia data. A real time clock 215 is similar to the real time clock 202 in the server unit. A disk I/F 216 is a disk control circuit for directing a magnetic disk drive 217 to read or write data. The magnetic disk drive 217 is used for recording the operating system of the client and the control program for reproduction of multimedia data.

Figure 2:
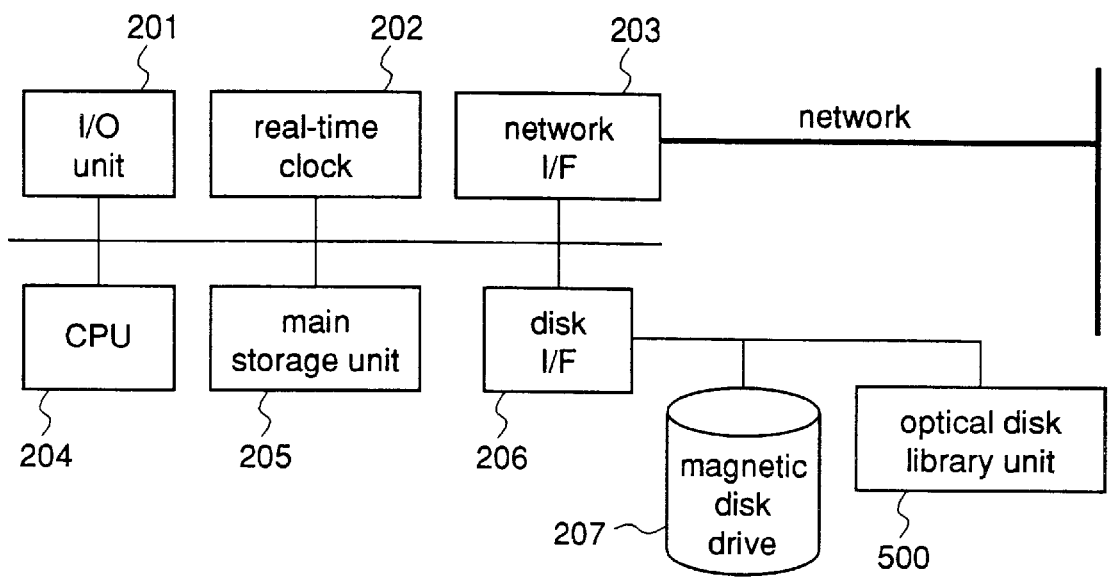
FIGS. 2(a) and 2(b) are block diagrams illustrating hardware structures of a server and a client, respectively, in the multimedia server system according to the first embodiment of the invention.
Figure 2:
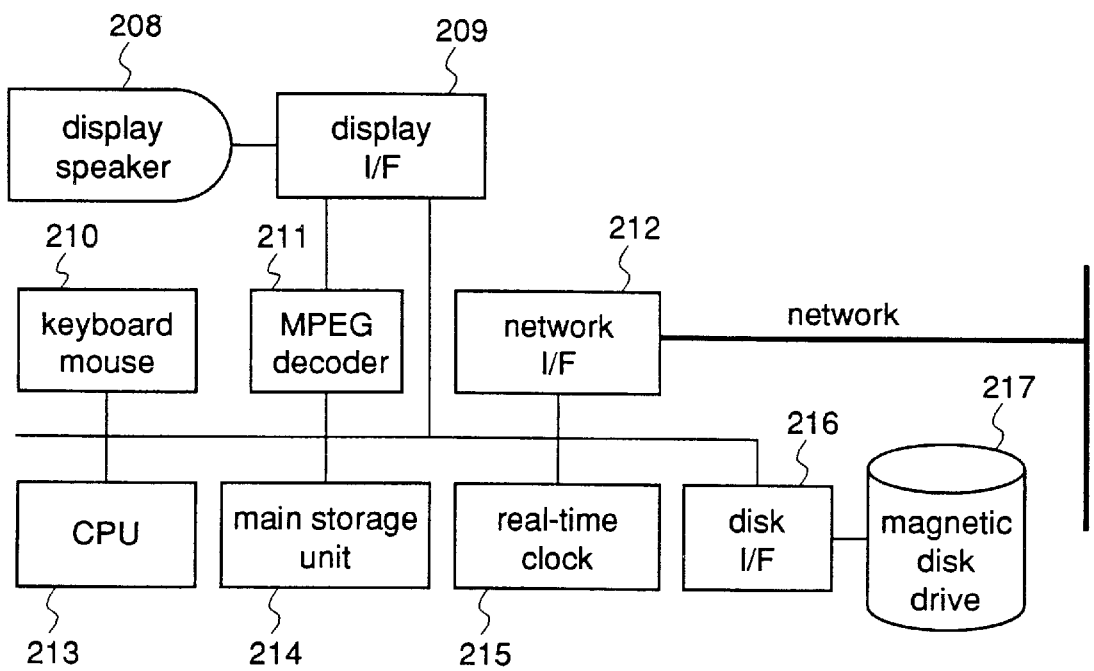
Figure 3:
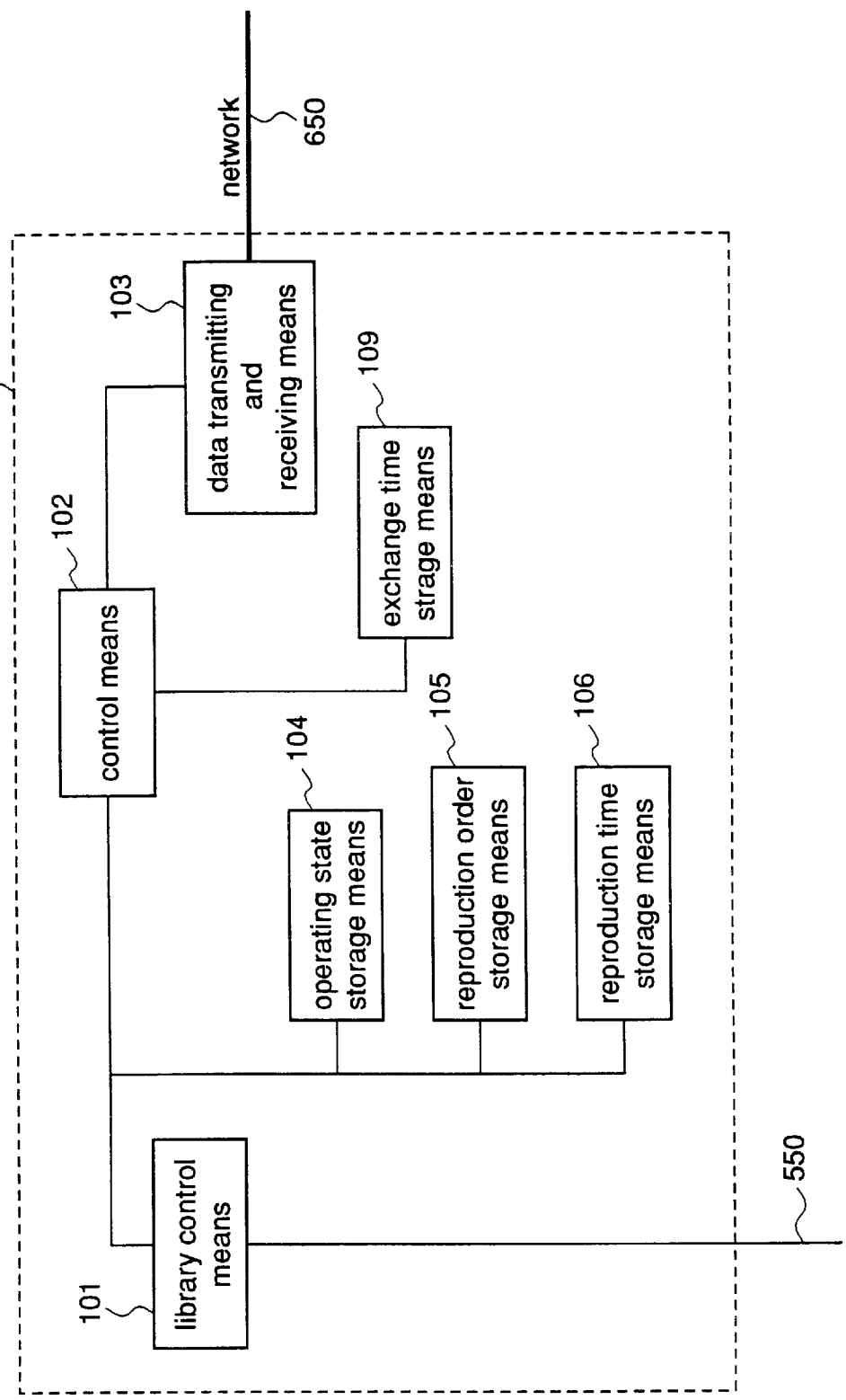
FIG. 3 is a block diagram illustrating a server unit according to the first embodiment of the invention.

FIG. 3 is a block diagram illustrating the server unit 100 viewed from its function. In FIG. 3, a library control means 101 is implemented by the disk I/F 206 shown in FIG. 2(a) and the control program, and outputs an instruction to control the optical disk library unit 500. A control means 102 is implemented by the CPU 204, the main storage unit 205, which are shown in FIG. 2(a), and the control program for reproduction of multimedia data. The control means 102 includes means for reading multimedia data from an optical disk and controls reading and transmission of multimedia data in response to a request from the client. A data transmitting and receiving means 103 is implemented by the network I/F 203 shown in FIG. 2(a) and the control program, and exchanges data with the client through the network 650. A operating state storage means 104 is implemented by the main storage unit 205 and the magnetic disk drive 207 shown in FIG. 2(a), and stores the operating state of the optical disk drive in the optical disk library unit 500. A reproduction order storage means 105 is implemented by the main storage unit 205 and the magnetic disk drive 207 shown in FIG. 2(a), and stores the order of optical disks to be reproduced when desired multimedia data is recorded over plural optical disks. A reproduction time storage means 106 is implemented by the main storage unit 205 and the magnetic disk drive 207 shown in FIG. 2(a), and stores the time required for reproduction of multimedia data. An exchange time storage means 109 is implemented by the main storage unit 205 and the magnetic disk drive 207 shown in FIG. 2(a), and stores the time required for exchange of the optical disks in the optical disk drive in the library unit 500.

Figure 4:
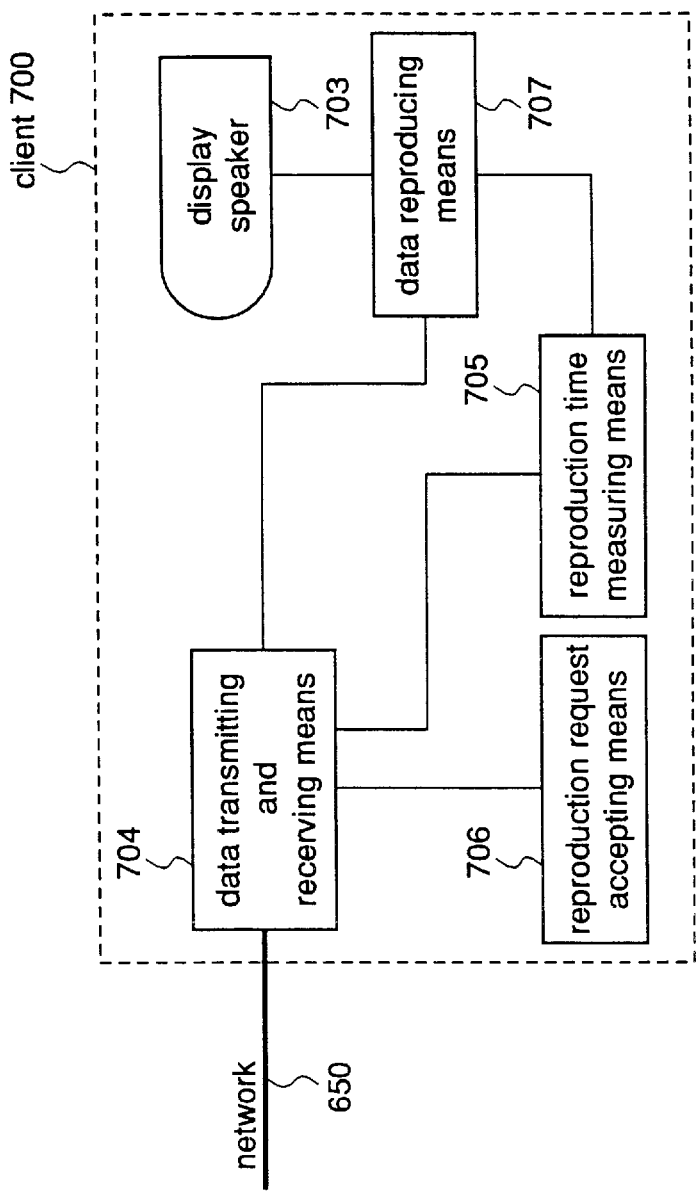
FIG. 4 is a block diagram illustrating a client according to the first embodiment of the invention.

FIG. 4 is a block diagram illustrating the client 700 viewed from its function. In FIG. 4, a reproduction request accepting means 706 is implemented by the input unit 210 and the display unit 208 shown in FIG. 2(b) and the control program for reproduction of multimedia data, and this means 706 accepts a request for reproduction of multimedia data from a user. A data reproducing means 707 is implemented by the MPEG decoder 211 and the display I/F shown in FIG. 2(b) and the control program for reproduction of multimedia data. This means 707 expands multimedia data compressed by MPEG so that the data can be displayed on the display unit 208, reproduces the data, and displays the data on the display unit 703. A data transmitting and receiving means 704 is implemented by the network I/F 203 shown in FIG. 2(b) and the control program, and exchanges data or requests with the server unit 100 through the network 650. A reproduction time measuring means 705 is complemented by the real time clock 215 shown in FIG. 2(b). When multimedia data is reproduced, the measuring means 705 measures the time required for the reproduction and transmits the result of the measurement, through the data transmitting and receiving means 704 and the network 650, to the control means 102 of the server unit 100.

FIGS. 5(a) to 5(c) show data structures recorded in the operating state storage means 104, the reproduction order storage means 105, and the reproduction time storage means 106, respectively. The operating state storage means 104 stores the present state of each optical disk drive in the library unit 500, and the identification number of the optical disk mounted in the optical disk drive. The data stored in the operating state storage means 104 are updated by the control means 102 for each operation of the optical disk drive. The reproduction order storage means 105 stores the title of multimedia data, the number of optical disks over which the multimedia data is recorded, the order of the optical disks to reproduce the multimedia data, the identification number of each optical disk, and the storage position of each optical disk. The reproduction time storage means 106 stores the time required for reproduction of the multimedia data.

Figure 6:
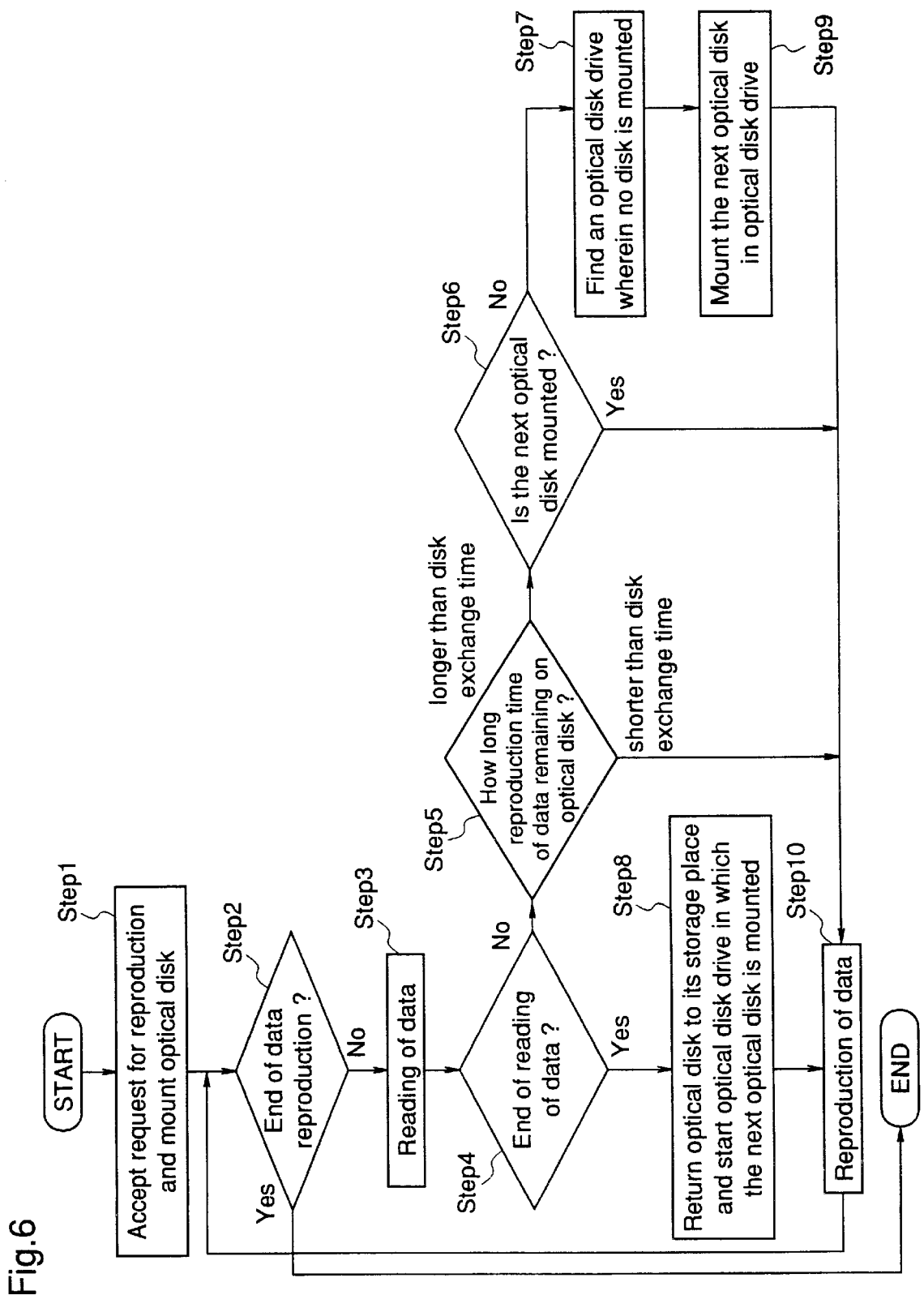
FIG. 6 is a flowchart illustrating the operation of the multimedia server system according to the first embodiment of the invention.

FIG. 6 is a flowchart illustrating the operation of the multimedia server system according to the first embodiment of the invention when multimedia data recorded over plural optical disks is reproduced.

It is assumed that two optical disk drives, "Drive0" and "Drive1", are contained in the optical disk library unit 500, and multimedia data having a title "multi01" is recorded over two optical disks, each for ten minutes. These optical disks have identification numbers, "disk#0" and "disk#1", in the order at the recording, and the optical disks "disk#0" and "disk#1" are contained in slots #0 and #1 of the optical disk library unit 500, respectively. The time required for exchange of these disks in the library unit 500 is six seconds.

FIGS. 7(a) to 7(b) show contents stored in the operating state storage means 104, the reproduction order storage means 105, the reproduction time storage means 106, and the exchange time storage means 109, respectively. Before starting reproduction, the operating state storage means 104 has contents shown in the first table (1. before reproduction) in FIG. 7(a), and the reproduction order storage means 105, the reproduction time storage means 106, and the exchange time storage means 109 have contents shown in FIGS. 7(b), 7(c), and 7(d), respectively.

Hereinafter, the operation of the multimedia server system according to the first embodiment of the invention will be described according to the flowchart shown in FIG. 6.

First of all, in step 1, when the reproduction request accepting means 706 in the client 700 accepts a request for reproduction of multimedia data having the title "multi01" from the user, the data transmitting and receiving means 704 transmits this request through the network 650 to the data transmitting and receiving means 103 in the server unit 100. Then, the data transmitting and receiving means 103 transmits the request to the control means 102. Receiving the request, the control means 102 finds that the first optical disk in which multimedia data having the requested title "multi01" is recorded is the optical disk "disk#0" whose reproduction order is "1", and this disk is contained in the slot #0, in reference to the contents of the reproduction order storage means 105 shown in FIG. 7(b). Then, from the contents of the operating state storage means 104 shown in the first table (1. before reproduction) in FIG. 7(a), the control means 102 finds that both the optical disk drives "Drive0" and "Drive1" stand by, i.e., no optical disk is mounted in these drives.

Thereafter, control means 102 operates the conveyer 504 in the optical disk library unit 500, through the library control means 101 and the controller 505 in the optical disk library unit 500, so that the conveyer 504 takes the optical disk "disk#0" from the slot #0 of the storage shelf 502 and inserts the disk in the optical disk drive "Drive0" which is in the "stand-by" state, i.e., in which drive no disk is mounted. The operation of the optical disk library unit is similar to that described for the prior art unit. Thereafter, the control means 102 updates the contents of the operating state storage means 104, as shown in the second table (2. after step 1) in FIG. 7(a).

In step 2, the control means 102 finds that the total time required for reproduction of the multimedia data "multi01" is twenty minutes, from the contents of the reproduction time storage means 106 shown in FIG. 7(c), and judges whether or not the reproduction of the multimedia data "multi01" is completed by comparing the time required for the reproduction, i.e., twenty minutes, with the reproduction time measured by the reproduction time measuring means 705 in the client 700. When the judgment is that the reproduction is not completed, the control means 102 proceeds to step 3.

In step 3, the target multimedia data "multi01" is read from the optical disk "disk#0" in the optical disk drive "Drive0". In step 4, the control means 102 judges whether the data equivalent to the time required for reproduction of the target data from the disk "disk#0" (ten minutes) has been read from the optical disk "disk#0". Since the reproduction has just started in this stage, it is judged that the data equivalent to ten minutes has not been completely read yet, followed by step 5.

In step 5, the control means 102 calculates the time required for reproduction of the target data remaining in the optical disk "disk#0" by subtracting the present reproduction time from the time required for reproduction of the target data from the optical disk "disk#0" (ten minutes), on the basis of the reproduction time measured by the reproduction time measuring means 705 and the contents of the reproduction time storage means 106. Then, the control means 102 compares the time required for exchange of disks, which is stored in the exchange time storage means 109, with the remaining reproduction time. Since the reproduction has just started and the remaining reproduction time is longer then the disk exchange time, the control means 102 proceeds to step 6.

In step 6, the control means 102 checks the operating state storage means 104 and the reproduction order storage means 105 to judge whether a set-up for reproduction of the next optical disk "disk#1" is done. Since the contents of the operating state storage means 104 are as shown in the second table (2. after step 1) in FIG. 7(a), the control means 102 judges that the next optical disk "disk#1" is not yet mounted in the optical disk drive, followed by step 7.

In step 7, the control means 102 checks the stand-by optical disk drives, i.e., drives in which optical disks are not mounted, according to the contents of the operating state storage means 104, and finds "Drive1". Then, the control means proceeds to step 9.

In step 9, the control means 102 instructs the conveyer 504 in the library unit 500 to take the optical disk "disk#1" from the slot #1 of the storage shelf 502 and insert the disk in the stand-by optical disk drive "Drive1". Thereafter, the control means 102 updates the contents of the operating state storage means 104, as shown in the third table (3. after step 9) in FIG. 7(a).

Step 10 is executed to reproduce the target multimedia data. More specifically, the data read from the optical disk "disk#0" in the optical disk drive "Drive0" is transmitted from the data transmitting and receiving means 103 in the server unit 100, through the network 650, to the data transmitting and receiving means 704 in the client 700. Then, the compressed data is expanded by the MPEG decoder in the reproducing means 707 and displayed on the display unit 703.

After step 10, the control means 102 returns to step 2. As long as the judgment in step 5 is that the time required for reproduction of the data remaining in the optical disk "disk#0" is longer than the disk exchange time (six seconds), steps 2, 3, 4, 5, 6, and 10 are repeated to continue the reproduction.

When the control means 102 judges, in step 5, that the remaining reproduction time is shorter than the disk exchange time, the control means 102 proceeds to step 10. Thereafter, steps 2, 3, 4, 5, and 10 are repeated until the control means 102 judges, in step 4, that the reading of the target data is completed. When it is judged in step 4 that the reading of the target data from the optical disk "disk#0" is completed, the control means 102 proceeds to step 8.

In step 8, in reference to the contents of the reproduction order storage means 105, the control means 102 controls the conveyer 504 in the optical disk library unit 500, through the library control means 101, so that the conveyer 504 returns the optical disk "disk#0", for which reading of the target data has just finished, to the slot #0 of the storage shelf 502. Then, in reference to the contents of the operating state storage means 104, the control means 102 finds that the optical disk "disk#1" to be reproduced next is inserted in the optical disk drive "Drive1", and starts the drive "Drive1". The control means 102 updates the contents of the operating state storage means 104 as shown in the fourth table (4. after step 8) in FIG. 7(a).

Step 10 is executed to continue the reproduction of the target multimedia data. The multimedia data read from the optical disk "disk#0" in the last step 3 is transmitted from the data transmitting and receiving means 103 in the server unit 100, through the network 650, to the data transmitting and receiving means 704 in the client 700. Then, the compressed data is expanded by the MPEG decoder in the reproducing means 707 and displayed on the display unit 703.

In step 2, the control means 102 judges that the reproduction of the multimedia data "multi01" is not completed yet by comparing the contents of the reproduction time storage means 106 with the reproduction time measured by the reproduction time measuring means 705, followed by step 3.

In step 3, the target multimedia data "multi01" is read from the optical disk "disk#1" mounted in the optical disk drive "Drive1". In step 4, the control means 102 judges whether reading of the target data equivalent to the time required for reproduction of the data from the optical disk "disk#1" is completed. Since the reproduction has just started, the control means 102 judges that the reading is not completed yet, and proceeds to step 5.

In step 5, the time required for reproduction of the data remaining in the optical disk "disk#1" is calculated, and this time is compared with the time required for exchange of the optical disks. When the remaining reproduction time is longer than the disk exchange time, the control means 102 proceeds to step 6.

In step 6, the control means 102 checks the reproduction order storage means 105 and finds that no optical disk follows. Since it is not necessary to prepare the next optical disk, step 10 is executed. Thereafter, similar process steps are continued until the reproduction of the multimedia data "multi01" from the optical disk "disk#1" is completed.

As described above, in the multimedia server system according to the first embodiment of the invention, the server unit is equipped with the control means, the reproduction order storage means providing the order of the optical disks to be reproduced, and the operating state storage means providing the states of the optical disk drives. The control means controls the optical disk library unit according to the reproduction order of the disks and the operating states of the drives so that the optical disk to be reproduced next is mounted in a free optical disk drive in advance. Hence, reading of multimedia data from the next optical disk can be started immediately after reading of multimedia data from the previous optical disk is ended. Accordingly, when multimedia data recorded over plural optical disks is reproduced, unwanted interruption due to exchange of disks is avoided. As a result, reproduction of multimedia data is smoothly carried out.

[Embodiment 2]

In a multimedia server system according to a second embodiment of the invention, when multimedia data recorded over plural optical disks is reproduced, optical disk drives used for the reproduction are reserved in advance.

The structure of the server system, the hardware structures of the server and the client, the structure of the client, and the structure of the library unit according to this second embodiment are identical to those according to the first embodiment and, therefore, FIGS. 1, 2(a), 2(b), 4, and 28 are used to explain the second embodiment.

Figure 8:
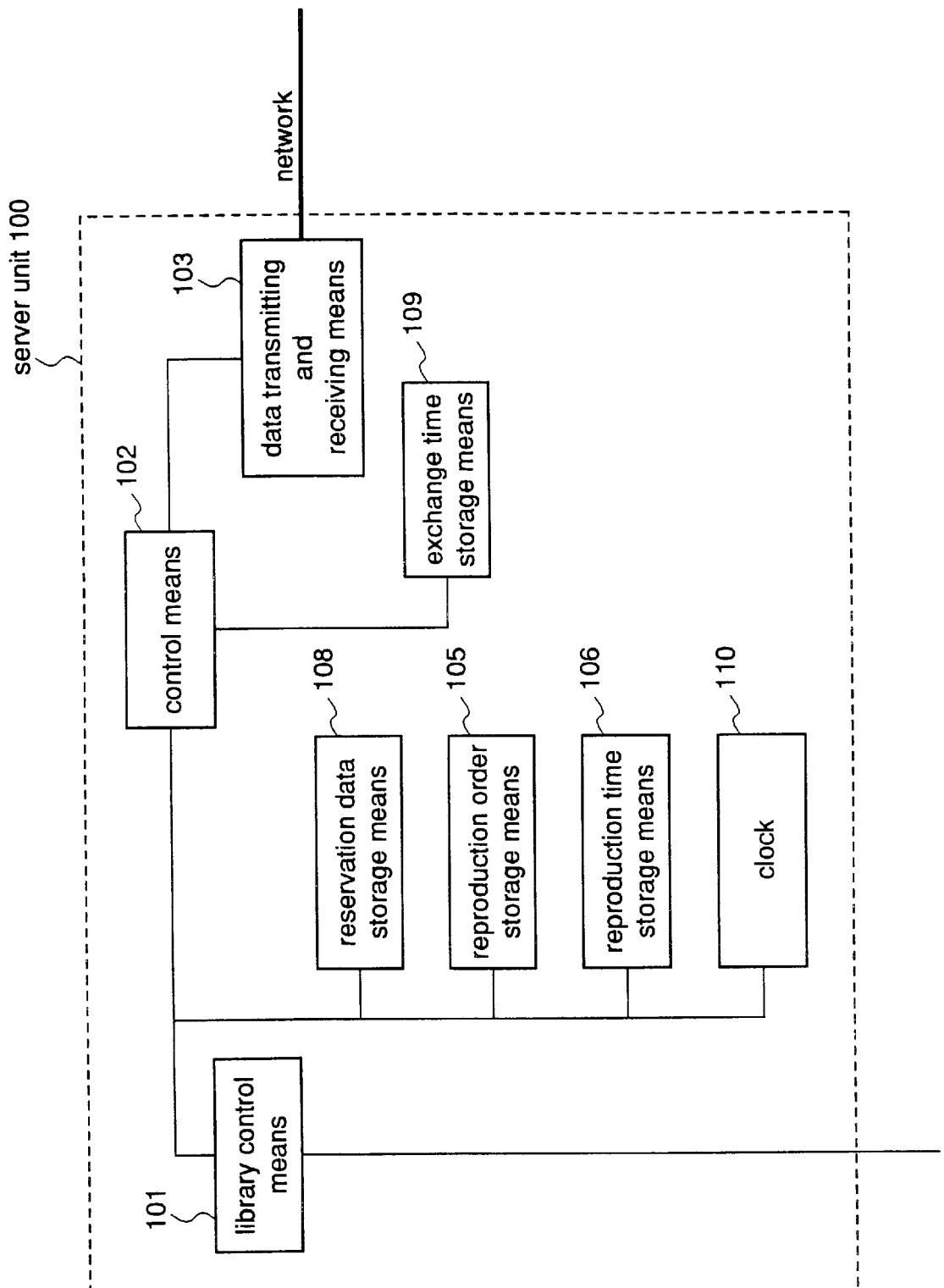
FIG. 8 is a block diagram illustrating a server unit according to a second embodiment of the invention.

FIG. 8 is a block diagram illustrating a server unit 100 according to the second embodiment of the invention. In the figure, the same reference numerals as those shown in FIG. 3 designate the same or corresponding parts. Reference numeral 108 designates a reservation data storage means 108, and reference numeral 110 designates a clock. The reservation data storage means 108 is implemented by the main storage unit 205 and the magnetic disk drive 207 shown in FIG. 2(a), and stores an optical disk to be reproduced, an optical disk drive used for reproduction, the reproduction time, and the reservation time. The clock 110 is implemented by the real time clock shown in FIG. 2(a) and the control program, and shows the present time.

FIGS. 9(a) to 9(c) show data structures stored in the reservation data storage means 108, the reproduction order storage means 105, and the reproduction time storage means 106, respectively. The reservation data storage means 108 stores data showing the state of reservation for an optical disk drive. More specifically, as shown in FIG. 9(a), it stores, the identification number of an optical disk to be reproduced, the number of an optical disk drive used for the reproduction, the reproduction time required for the reproduction, and the reservation time obtained by adding the disk exchange time to the reproduction time. The data structures in the reproduction order storage means 105 and the reproduction time storage means 106 shown in FIGS. 9(b) and 9(c), respectively, are similar to those described for the first embodiment.

Figure 10:
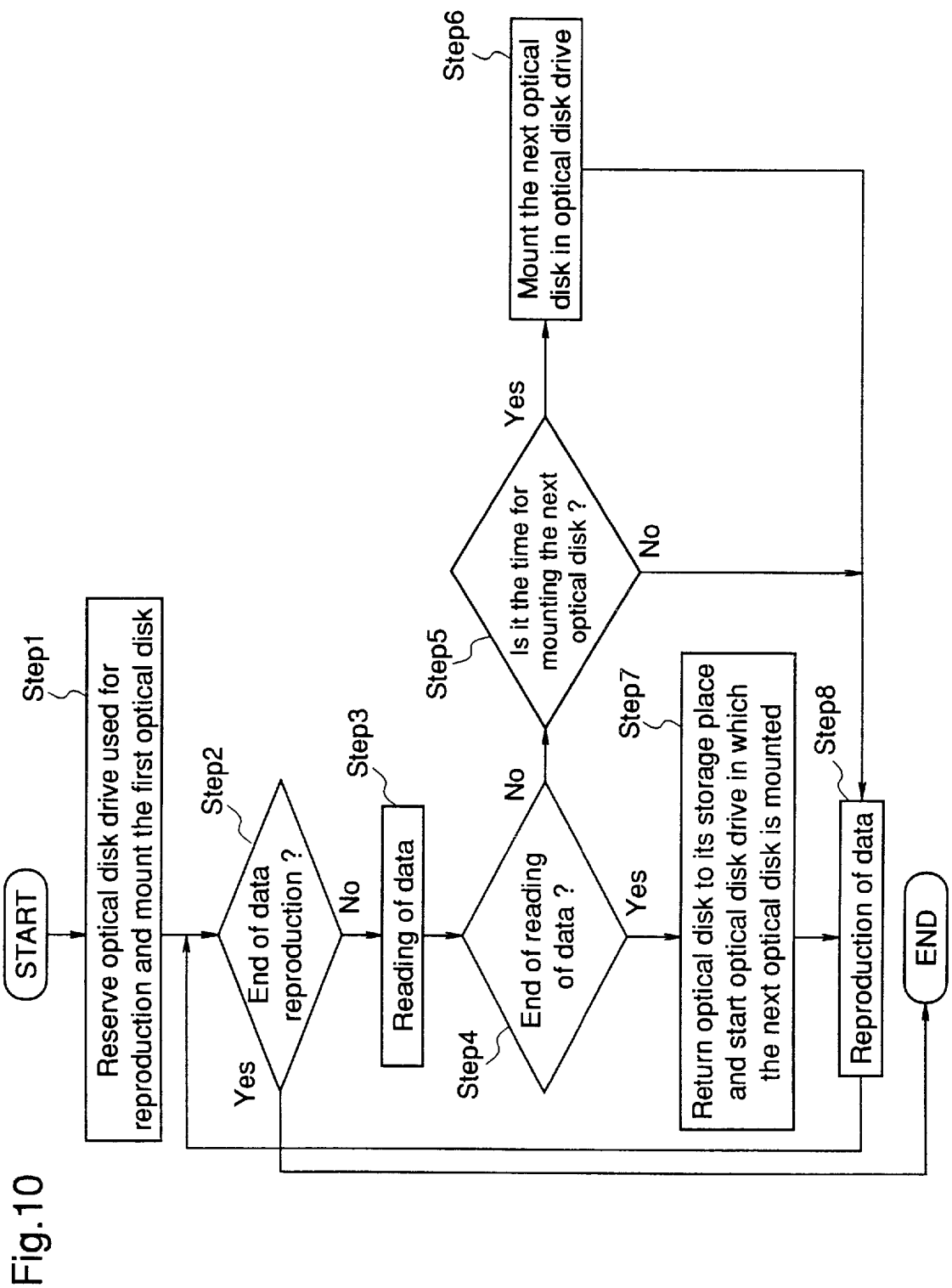
FIG. 10 is a flowchart illustrating the operation of a multimedia server system according to the second embodiment of the invention.

FIG. 10 is a flowchart for explaining the operation of the multimedia server system according to the second embodiment of the invention. FIGS. 11(a) to 11(d) are tables illustrating specific data stored in the respective storage means.

As in the first embodiment of the invention, it is assumed that two optical disk drives, "Drive0" and "Drive1", are contained in the optical disk library unit 500, and multimedia data having a title "multi01" is recorded over two optical disks, each for ten minutes. The identification numbers of these two optical disks are, respectively, "disk#0" and "disk#1" in the order of the recording. Further, these optical disks "disk#0" and "disk#1" are contained in slots #0 and #1 in the optical disk library unit 500, respectively. Furthermore, multimedia data having a title "multi02" is recorded over two optical disks "disk#13" and "disk#14", and these optical disks are contained in slots #3 and #4 in the library unit 500, respectively. The multimedia data "multi02" is divided into two parts, each for nine minutes and fifty seconds, and recorded in the optical disks "disk#13" and "disk#14" in this order. The time required for exchange of disks in the library unit 500 is six seconds.

Before starting reproduction, the reservation data storage means 108 have data shown in the first table (1. before reservation) in FIG. 11(a). The reproduction order storage means 105, the reproduction time storage means 106, and the exchange time storage means 109 have data shown in FIGS. 11(b), 11(c), and 11(d), respectively.

Hereinafter, the operation of the multimedia server system according to the second embodiment will be described using the flowchart shown in FIG. 10.

As described for the first embodiment of the invention, a request for reproduction of multimedia data "multi01" is accepted by the client 700 and transmitted to the server unit 100.

In step 1, the control means 102 checks the present time with the clock 110. The present time is 12:59:00. Then, the control means 102 checks the contents of the reservation data storage means 108. As shown in the first table (1. before reservation) in FIG. 11(a), the optical disk drives "Drive0" and "Drive1" are already reserved for 12:59:54~13:09:50 and 13:09:44~13:19:40, respectively, to reproduce the multimedia data "multi02".

Therefore, in order to reproduce the multimedia data "multi01" during periods of time other than mentioned above, the control means 102 checks the data relating to "multi01" from the contents of the reproduction order storage means 105 and the reproduction time storage means 106 shown in FIGS. 11(b) and 11(c), respectively. Further, the control means 102 checks the exchange time storage means 109, and adds the time required for exchange of the disks, i.e., six seconds, to the time required for reproduction of the data "multi01" in each optical disk, i.e., ten minutes.

Then, the control means 102 calculates a reservable period of time in each optical disk drive, and decides that the optical disk drive "Drive0" can be reserved for 13:09:54~13:20:00 and the optical disk drive "Drive1" can be reserved for 13:19:54~13:30:00. Then, the control means 102 stores, in the reservation data storage means 108, the optical disks, the reserved optical disk drives, the reproduction time for each disk, and the reservation time for each drive, as shown in the second table (2. after reservation) in FIG. 11(a).

Next, the control means 102 checks the clock 110 at constant time intervals, and mounts the first optical disk "disk#0" having the multimedia data "multi01" in the optical disk drive "Drive0".

Thereafter, steps 2 to 4 are executed as already described for the first embodiment, followed by step 5. In step 5, the control means 102 finds that the present time is 13:19:54, and compares the present time with the reservation time stored in the reservation data storage means 108. When the present time has not reached the reservation time, the control means 102 judges that it is not time to mount the next optical disk, so the control means 102 proceeds to step 8. In step 8, the multimedia data is reproduced as described for step 10 according to the first embodiment, followed by steps 2 to 4. Until it is judged in step 5 that time to start mounting of the next optical disk is reached, the above-mentioned process steps are repeated.

When it is judged in step 5 that time to start mounting of the next optical disk "disk#1" is reached, the control means 102 proceeds to step 6.

In step 6, the control means 102 checks the contents of the reservation data storage means 108 and controls the library unit 500 through the library control means 101 to mount the next optical disk "disk#1" in the reserved optical disk drive "Drive1", followed by step 8. In step 8, reproduction of the multimedia data recorded in the optical disk "disk#1" is performed. Thereafter, process steps similar to those described for the first embodiment are repeated.

As described above, in the multimedia server system according to the second embodiment of the invention, the server unit is equipped with the reservation data storage means and, before starting reproduction, the control means reserves an optical disk drive for a prescribed period of time including the time required for exchange of optical disks, according to the contents of the respective storage means, so that the data reproduction time is not interrupted between the respective optical disk drives. In this way, the operation of each optical disk drive is controlled with time. Therefore, when multimedia data recorded over plural optical disks is reproduced, unwanted interruption in reproduction due to exchange of the disks is avoided, whereby smooth reproduction of the multimedia data is realized. Further, the optical disk drives in the library unit can be used with high efficiency in response to requests of plural clients.

[Embodiment 3]

In a multimedia server system according to a third embodiment of the invention, when multimedia data recorded over plural optical disks is recorded, a portion of the data equivalent to the time required for exchange of the disks is temporarily stored in advance, and the stored data is reproduced when the disks are exchanged.

The multimedia server system according to this third embodiment is identical to the multimedia server system according to the first embodiment in the structure of the server system, the hardware structures of the server and the client, the structure of the client, and the structure of the library unit and, therefore, FIGS. 1, 2(*a*), 2(*b*), 4, and 28 are used to explain the third embodiment.

Figure 12:
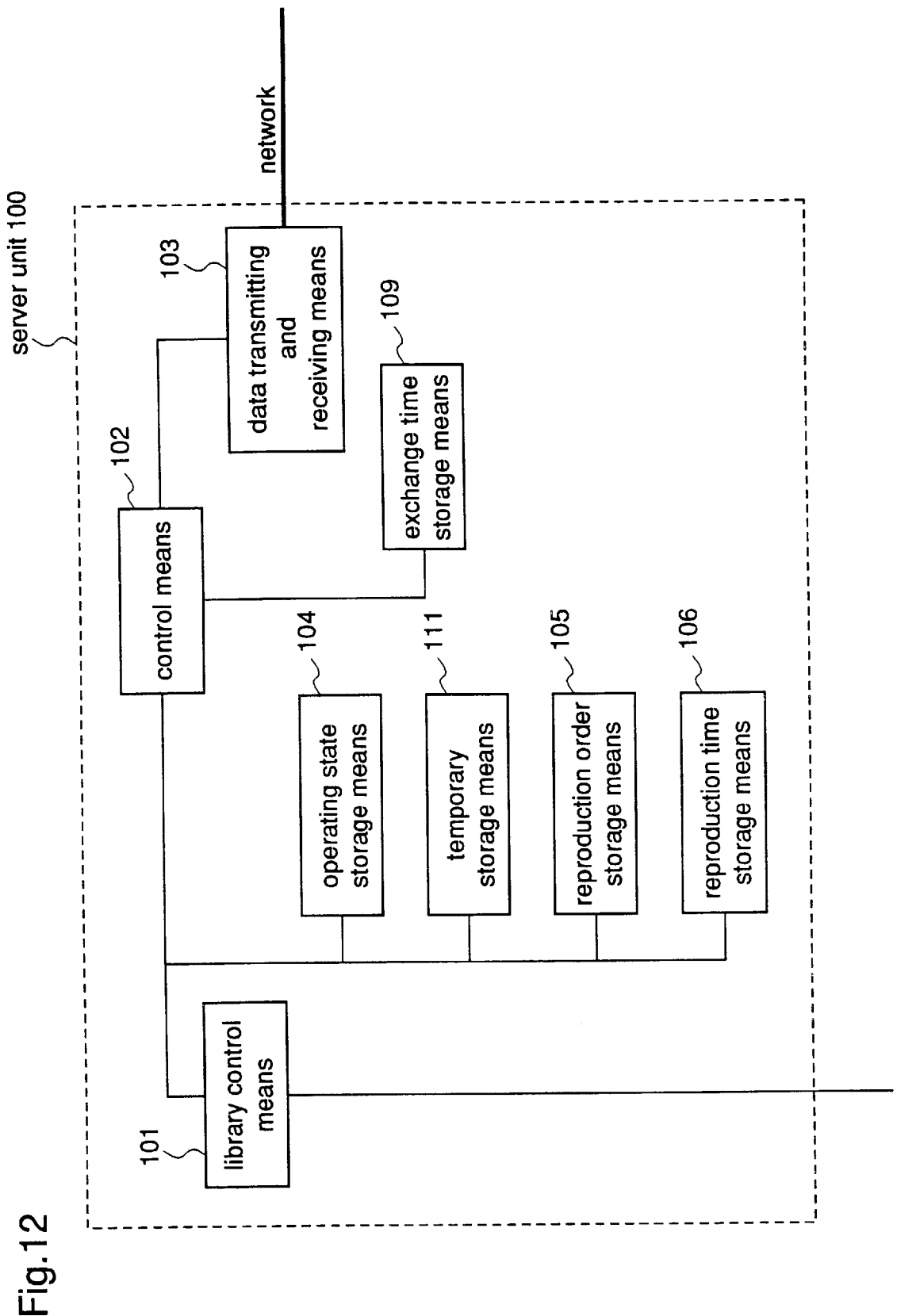
FIG. 12 is a block diagram illustrating a server unit according to a third embodiment of the invention.

FIG. 12 is a block diagram illustrating a server unit 100 according to the third embodiment of the invention. In FIG. 12, the same reference numerals as those shown in FIG. 3 designate the same or corresponding parts. A temporary storage means 111 is implemented by the main storage unit 205 and the magnetic disk unit 207 shown in FIG. 2(*a*), and temporarily stores multimedia data read from the optical disk in the library unit. The control means 102 includes means for prefetching the multimedia data, in addition to the data reading means.

Figure 13:
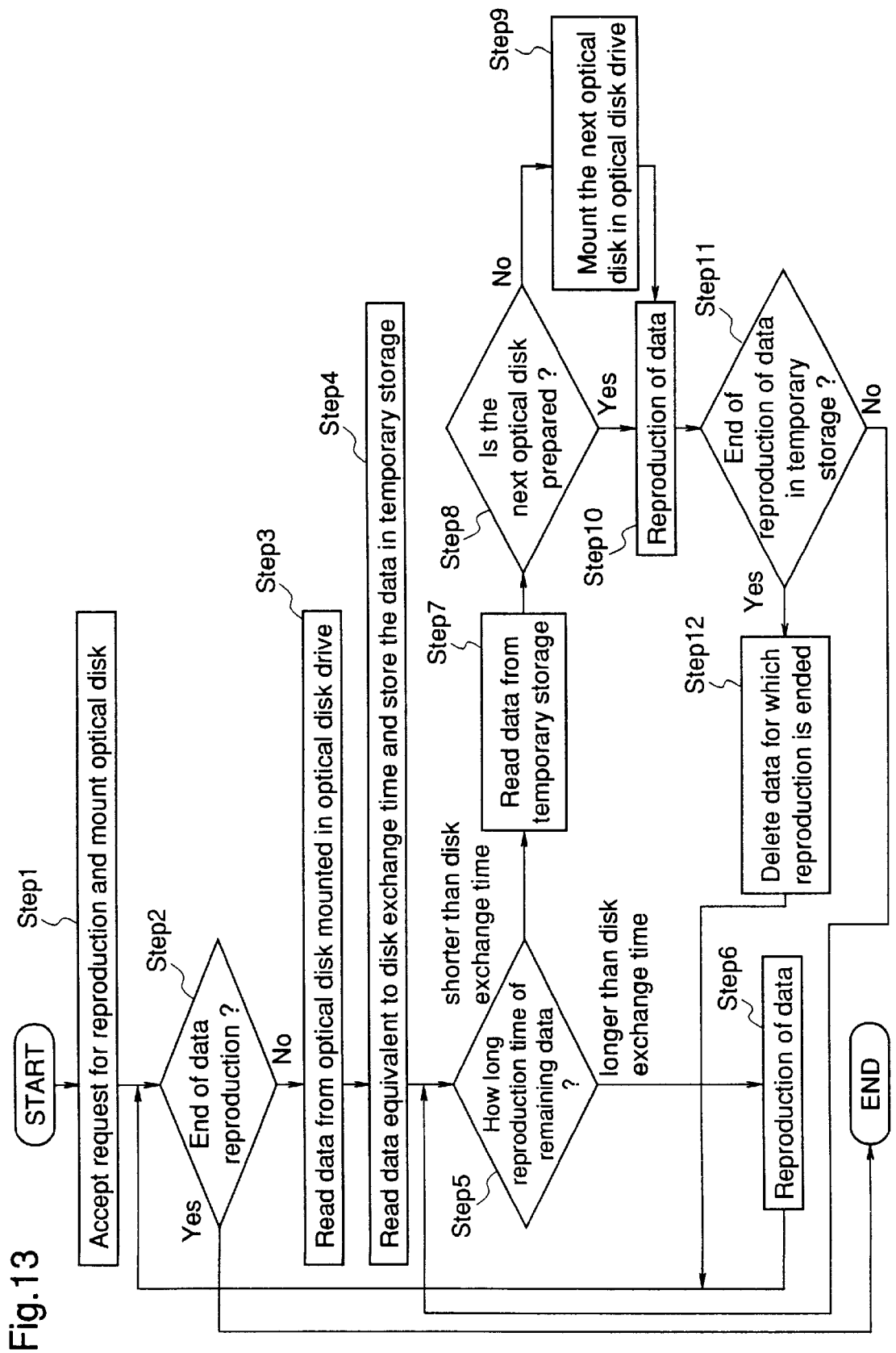
FIG. 13 is a flowchart illustrating the operation of a multimedia server system according to the third embodiment of the invention.

FIG. 13 is a flowchart for explaining the operation of the multimedia server system according to the third embodiment of the invention.

In the optical disk library unit 500, the optical disk drives, the recording condition of multimedia data "multi01", and the time required for exchange of optical disks are identical to those described for the first embodiment of the invention. Further, in the server unit 100, the reproduction order storage means 103, the reproduction time storage means 104, and the exchange time storage means 109 store the same data as shown in FIGS. 7(*b*), 7(*c*), and 7(*d*), respectively.

Hereinafter, the operation of the multimedia server system according to this third embodiment will be described using the flowchart shown in FIG. 13.

When a request for multimedia data "multi01" is accepted by the client 700, this request is transmitted to the server unit 100, and steps 1 and 2 are executed in the same manner as described for steps 1 and 2 according to the first embodiment, followed by step 3.

In step 3, the control means 102 reads the multimedia data "multi01" from the optical disk "disk#0" mounted in the optical disk drive "Drive0". Next, in step 4, since the reproduction time storage means 106 stores the data shown in FIG. 7(*c*) and the exchange time storage means 109 stores the data shown in FIG. 7(*d*), the control means 102 finds that the time required for reproduction of the multimedia data "multi01" in the optical disk "disk#0" is ten minutes and the time required for exchange of the optical disks is six seconds. According to these data, the control means 102 decides that a portion of the multimedia data "multi01" within a range from nine minutes and fifty-four seconds to ten minutes in the reproduction time is equivalent to the disk exchange time. Then, the control means 102 starts reading of the data for the disk exchange time from the optical disk "disk#0" by the prefetching means, and stores the data in the temporary storage means 111.

In step 5, the control means 102 calculates the time required for reproduction of remaining multimedia data in the optical disk "disk#0", from the reproduction time obtained by the reproduction time measuring means 705 and the data stored in the reproduction time storage means 106. Then, the control means 102 compares the remaining reproduction time with the contents of the exchange time storage means 109 and judges whether the remaining reproduction time is longer than the disk exchange time. In this stage, since the remaining reproduction time is longer than the disk exchange time (six seconds), the control means 102 proceeds to step 6. In step 6, reproduction of the multimedia data is performed in the same manner as described for step 10 according to the first embodiment, followed by step 2.

Until the control means 102 judges in step 5 that the remaining reproduction time for the multimedia data "multi01" recorded in the optical disk "disk#0" becomes equal to or shorter than the disk exchange time, steps 2 to 6 are repeated.

When it is judged in step 5 that the remaining reproduction time is equal to the disk exchange time, step 7 is executed. In step 7, the control means 102 reads the multimedia data "multi01" which is stored in the temporary storage means 111.

Next, in step 8, the control means 102 checks whether the next optical disk is prepared, according to the contents of the operating state storage means 104. In this stage, since the next optical disk is not prepared, the control means 102 proceeds to step 9.

In step 9, the control means 102 finds that the next optical disk is "disk#1" and this disk is contained in the slot #1, according to the contents of the reproduction order storage means 105. Then, the control means 102 controls the library unit 500 through the library control means 101 so that the optical disk "disk#1" is taken out of the slot #1 of the storage shelf and inserted in the optical disk drive "Drive1". Then, the control means 102 updates the contents of the operating state storage means 104.

Next, in step 10, the control means 102 transmits the multimedia data read from the temporary storage means 111, through the data transmitting and receiving means 103 and the network 650, to the client 700. The transmitted multimedia data is reproduced in the client 700.

In step 11, the control means 102 judges whether or not the reproduction of the multimedia data stored in the temporary storage means 111 is ended, by comparing the reproduction time measured by the reproduction time measuring means 705 with the contents of the reproduction time storage means 106. When the reproduction time does not reach the time required for the reproduction, the control means 102 judges that the reproduction is not ended yet and proceeds to step 5.

Until it is judged in step 11 that the reproduction of the multimedia data stored in the temporary storage means 111 is ended, steps 5, 7, 8, 10, and 11 are repeated.

In step 8, the control means 102 judges that the next optical disk is prepared, step 8 is followed by step 10. When it is judged in step 11 that the reproduction of the multimedia data stored in the temporary storage means 111 is ended, the control means 102 proceeds to step 12. In step 12, the control means 102 erases the multimedia data stored in the temporary storage means 111.

Thereafter, the control means 102 returns to step 2. In step 2, the control means 102 judges that the reproduction of the multimedia data "multi01" is not ended and proceeds to step 3. In step 3, the control means 102 controls the library control means 10 so that the multimedia data "multi01" is read from the optical disk "disk#1". The reading and reproduction of the multimedia data "multi01" from the optical disk "disk#1" are continued until the end of the reproduction.

As described above, in the multimedia server system according to the third embodiment of the invention, the server unit is equipped with the temporary storage means, and a portion of multimedia data equivalent to the disk exchange time is stored in the temporary storage means when reading of the multimedia data from the optical disk is started. Then, the control means exchanges the optical disk in the optical disk drive for the next optical disk during reproduction of the multimedia data stored in the temporary storage means. Therefore, reading of the multimedia data from the next optical disk can be started immediately after reading of the multimedia data from the temporary storage means is completed. As a result, when multimedia data recorded over plural optical disks is reproduced, unwanted interruption of the reproduction is avoided.

[Embodiment 4]

In a multimedia server system according to a fourth embodiment of the invention, when multimedia data recorded over plural optical disks is reproduced, a portion of the multimedia data, which is read out at a speed higher than a speed required for reproduction of the multimedia data, is stored temporarily and then transmitted.

Since the structure of the multimedia server system and the recording state of the multimedia data according to this fourth embodiment are identical to those already described for the third embodiment, repeated description is not necessary. Further, the optical disk drives in the optical disk library unit 500, the recording state of multimedia data "multi01", and the time required for exchange of optical disks are identical to those described for the first embodiment. In the server unit 100, the contents of the reproduction order storage means 105, the reproduction time storage means 106, and the exchange time storage means 109 are identical to those mentioned for the first embodiment, so that FIGS. 7(b), 7(c), and 7(d) are used for the description. Furthermore, it is assumed that a data reading speed of 150 KBytes/sec is required for reproduction of multimedia data "multi01".

Figure 14:
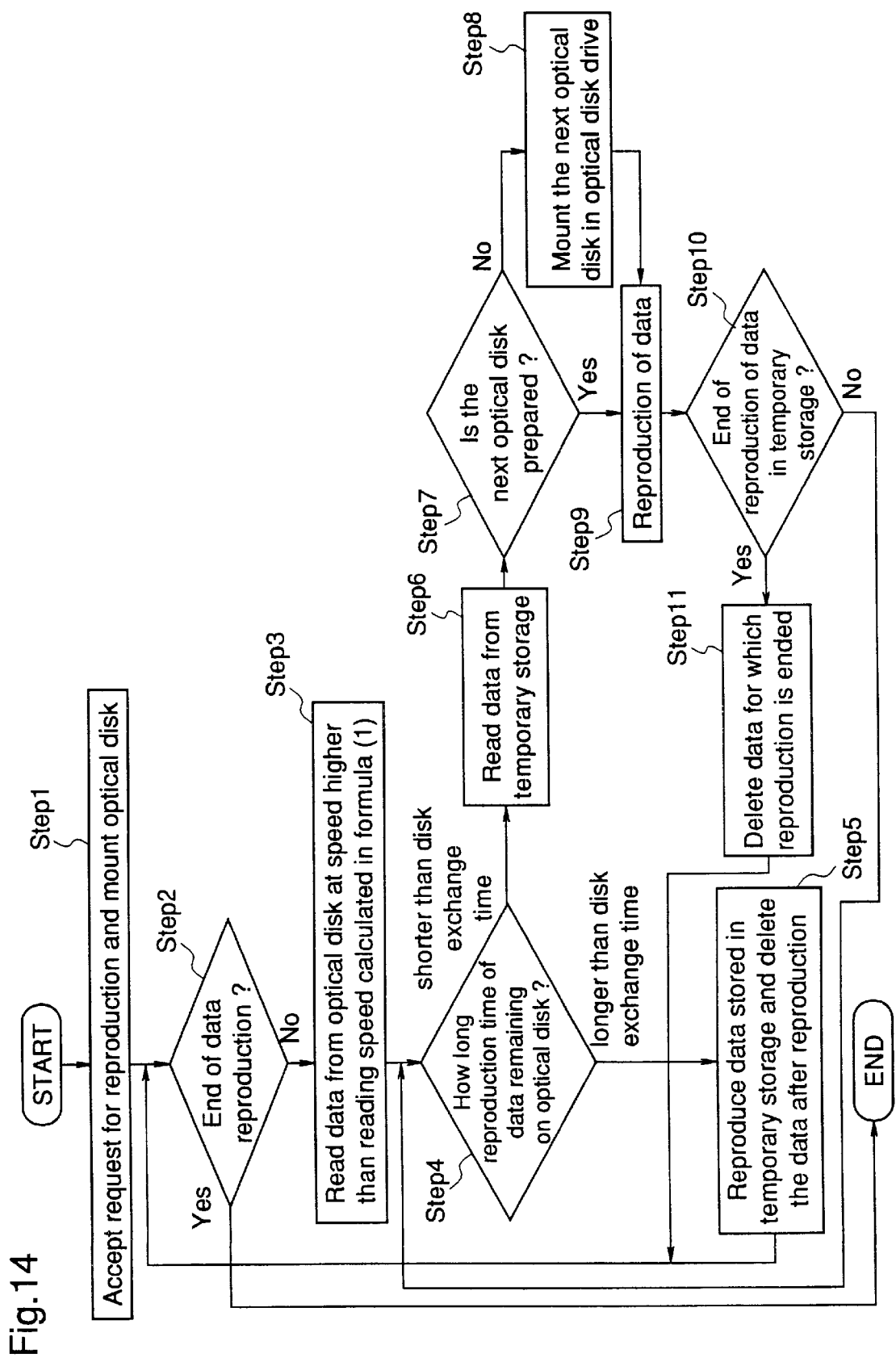
FIG. 14 is a flowchart illustrating the operation of a multimedia server system according to a fourth embodiment of the invention.

FIG. 14 is a flowchart for explaining the operation of the multimedia server system according to the fourth embodiment of the invention.

In FIG. 14, steps 1 and 2 are executed in the same manner as steps 1 and 2 according to the third embodiment. In step 3, the control means 102 decides a reading speed on the basis of the above-mentioned reading speed required for reproduction, i.e., 150 KBytes/sec, the reproduction time obtained from the contents of the reproduction time storage means 106, i.e., ten minutes (10 * 60 seconds), and the disk exchange time obtained from the contents of the exchange time storage means 109, i.e., six seconds, according to the following formula.

reading speed ≧ reading speed required for reproduction * reproduction time/(reproduction time−disk exchange time)

Therefore, reading speed ≧ 150(KBytes/sec) * (10 * 60)(sec)/(10 * 60−6)(sec)=151.5 (KBytes/sec)

The control means 102 decides that the reading speed is 640 KBytes/sec, reads the multimedia data from the optical disk "disk#0" at this speed, and stores the data in the temporary storage means 111.

Step 4 is executed in the same manner as step 5 according to the third embodiment, followed by step 5. In step 5, the data transmitting and receiving means 103 transmits the multimedia data stored in the temporary storage means 111 in step 3 through the network 650 to the client 700, and the multimedia data is reproduced in the client 700. Then, the control means 102 deletes the read and transmitted data from the temporary storage means 111, followed by step 2. Thereafter, steps 2 to 5 are repeated until the remaining reproduction time becomes equal to or shorter than the time required for exchange of the optical disk, and in step 5, the data stored in the temporary storage means 111 is reproduced.

When the remaining reproduction time becomes equal to the disk exchange time in step 4, step 6 is executed. Steps 6 to 11 are executed in the same manner as steps 7 to 12 described for the third embodiment. Thereafter, the same process steps as mentioned for the third embodiment are executed until the end of the reproduction.

As described above, in the multimedia server system according to the fourth embodiment of the invention, the server unit is equipped with the temporary storage means, and data which is read from the optical disk at a speed higher than the reading speed required for reproduction is stored in the temporary storage means. The data stored in the temporary storage means is transmitted to the client and reproduced. Since the speed for reading and temporarily storing the data is higher than the speed for transmitting the data, when the reproduction time required for the remaining multimedia data in the optical disk is equal to the disk exchange time, the amount of the multimedia data stored in the temporary storage means is larger than the amount of the data equivalent to the disk exchange time. Since the optical disk mounted in the optical disk drive is exchanged during reproduction of the temporarily stored multimedia data, reading of the multimedia data from the next optical disk can be started immediately after reading of the multimedia data from the temporary storage means is completed. Therefore, when multimedia data recorded over plural optical disks is reproduced, the reproduction can be performed continuously, without interruption due to exchange of the disks.

[Embodiment 5]

In a multimedia server system according to a fifth embodiment of the invention, the storage position of the optical disk to be reproduced next, which position is stored in advance of exchange of the optical disks, can be changed.

The structure of the multimedia server system and the recording state of multimedia data according to this fifth embodiment are identical to those mentioned for the third embodiment of the invention except the structure of the optical disk library unit.

Figure 15:
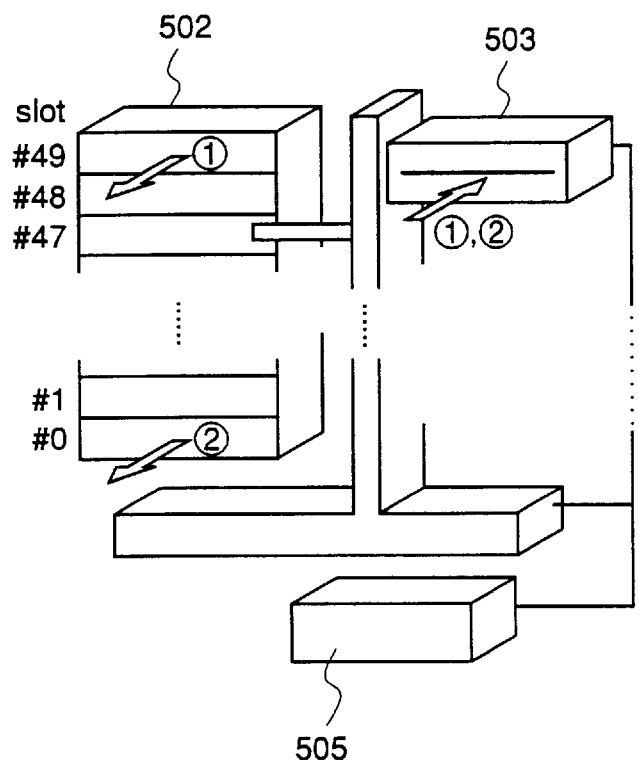
FIG. 15 is a schematic diagram illustrating an optical disk library unit according to the fourth embodiment of the invention.

FIG. 15 is a schematic diagram illustrating an optical disk library unit 500 according to the fifth embodiment of the invention. The library unit 500 includes a storage shelf 502 that contains fifty optical disks in slots #0 to #49. Multimedia data having a title "multi01" is recorded over two disks set in slots #0 and #1, and identification numbers of these optical disks are "disk#0" and "disk#1", respectively. The library unit 500 further contains an optical disk drive 503 having a drive number "Drive0". The positional relationship between the optical disk drive 503 and the respective slots of the storage shelf 502 is as follows. That is, the slot #0 is most distant from the optical disk drive 503, and the distance from the optical disk drive 503 reduces with an increase in the number of the slot. The disk exchange time is nine minutes when the disk is in the slot #0 which is most distant from the disk drive 503 whereas it is three minutes when the disk is in the slot #49 which is nearest to the disk drive 503.

The operation of the multimedia server system according to this fifth embodiment is fundamentally identical to the operation of the system according to the third or fourth embodiment except that, in step 1 of the flowchart shown in FIG. 13 or 14, the optical disk "disk#0" is mounted in the drive 503 and, after judgment in step 2 and before execution of step 3, the following operation is added.

That is, the control means 102 finds that an optical disk to be reproduced next is "disk#1" from the contents of the reproduction order storage means 105. Then, the control means 102 starts reading of the multimedia data "multi01" recorded in the optical disk "disk#0" mounted in the drive "Drive0" and, at the same time, the control means 102 takes the next optical disk "disk#1" from the slot #1 of the storage shelf 502 and exchanges an optical disk in the slot #49 which is nearest to the optical disk drive "Drive0" for the optical disk "disk#1". After the exchange of the optical disks, the control means 102 updates the storage position of the optical disk "disk#1" stored in the reproduction order storage means 105.

In the multimedia server system according to the fifth embodiment of the invention, before exchange of the optical disks, the optical disk to be reproduced next is moved to a storage position (slot) nearest to the optical disk drive, so that the time required for conveying the disk is reduced, resulting in a reduction in the disk exchange time. In the case mentioned above, the disk exchange time is reduced by about 6 seconds. Therefore, the amount of multimedia data to be stored temporarily for the time required to exchange the disks can be reduced. Since a high speed but expensive recording medium, such as a memory, is usually employed as means for temporarily storing the multimedia data, the reduction in the amount of the multimedia data temporarily stored in the storage means results in a reduction in the power consumption of the storage means, whereby continuous reproduction of multimedia data can be realized with less hardware resources, as compared to the third or fourth embodiment of the invention.

[Embodiment 6]

In a multimedia server system according to a sixth embodiment of the present invention, when multimedia data recorded over plural optical disks is reproduced, a portion of the multimedia data equivalent to the time required to exchange the optical disks is temporarily stored and then reproduced.

The structure of the multimedia server system, the hardware structures of the server and the client, the structure of the client, and the structure of the library unit, according to this sixth embodiment of the invention, are identical to those described for the first embodiment of the invention, so that FIGS. 1, 2, 4, and 28 are used for explaining the sixth embodiment.

Figure 16:
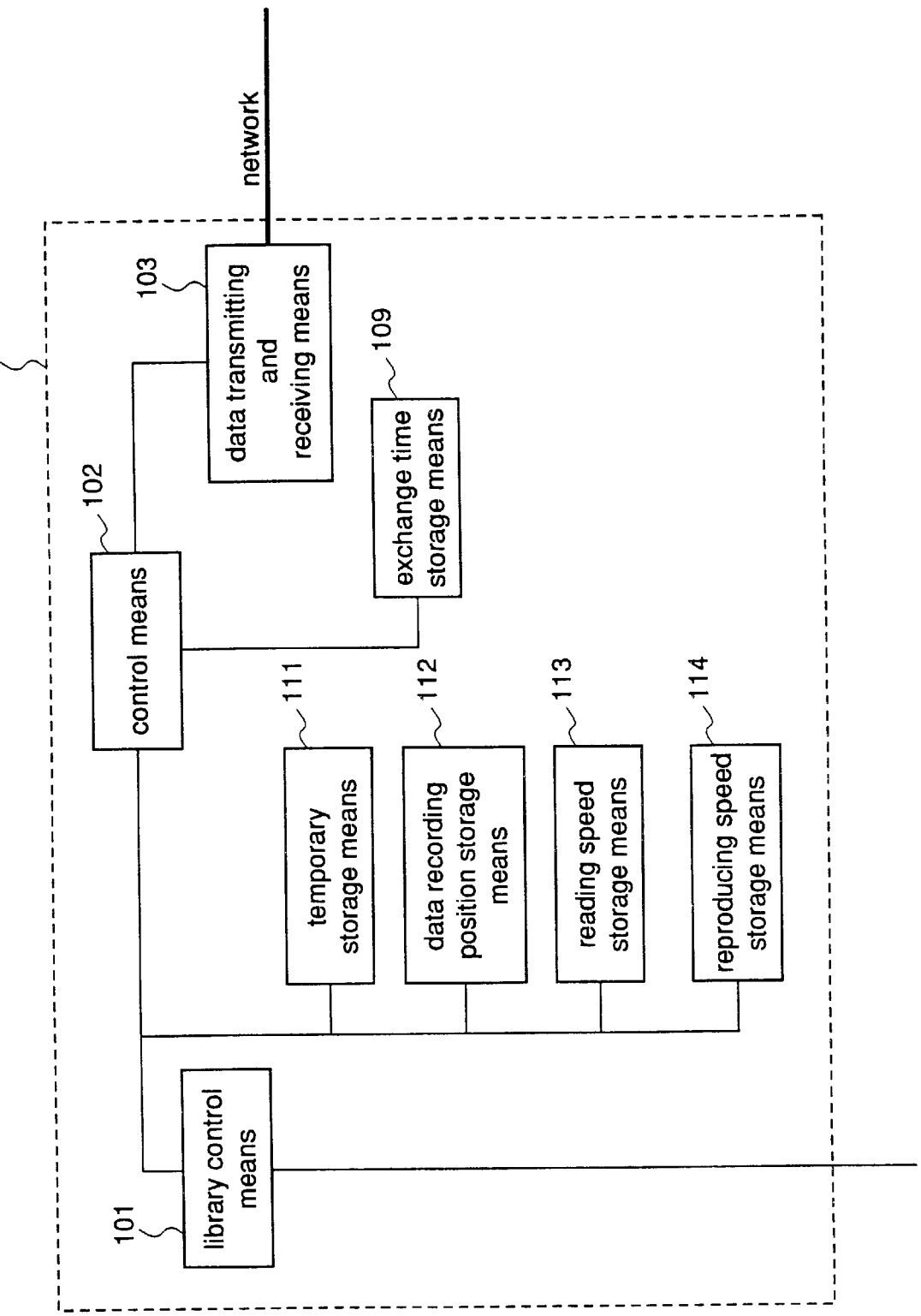
FIG. 16 is a block diagram illustrating a server unit according to a sixth embodiment of the invention.

FIG. 16 is a block diagram illustrating a server unit 100 according to the sixth embodiment of the invention. In the server unit 100, a library control means 101, a control means 102, a data transmitting and receiving means 103, and an exchange time storage means 109 are identical to those according to the first embodiment of the invention, and a temporary storage means 111 is identical to that according to the third embodiment of the invention. Hence, descriptions for these means are omitted. The control means 102 includes a prefetching means as in the third embodiment of the invention.

A data recording position storage means 112 is implemented by the main storage unit 205 and the magnetic disk drive 207 shown in FIG. 2(a), and stores titles (file names) of multimedia data, identification numbers of optical disks, recording positions (logical block addresses) of the multimedia data in the optical disks, and storage positions of the optical disks in the storage shelf 502 in the optical disk library unit 500. A reading speed storage means 113 is implemented by the main storage unit 205 and the magnetic disk drive 207 shown in FIG. 2(a), and stores the data reading speed from the optical disk mounted in the optical disk drive 503 in the library unit 500, as the number of logical blocks that can be read during a unit time. A reproduction speed storage means 114 is implemented by the main storage unit 205 and the magnetic disk drive 207 shown in FIG. 2(a), and stores the reading speed required for reproduction of the multimedia data recorded in the optical disk, as the number of logical blocks per a unit time.

Figure 18:
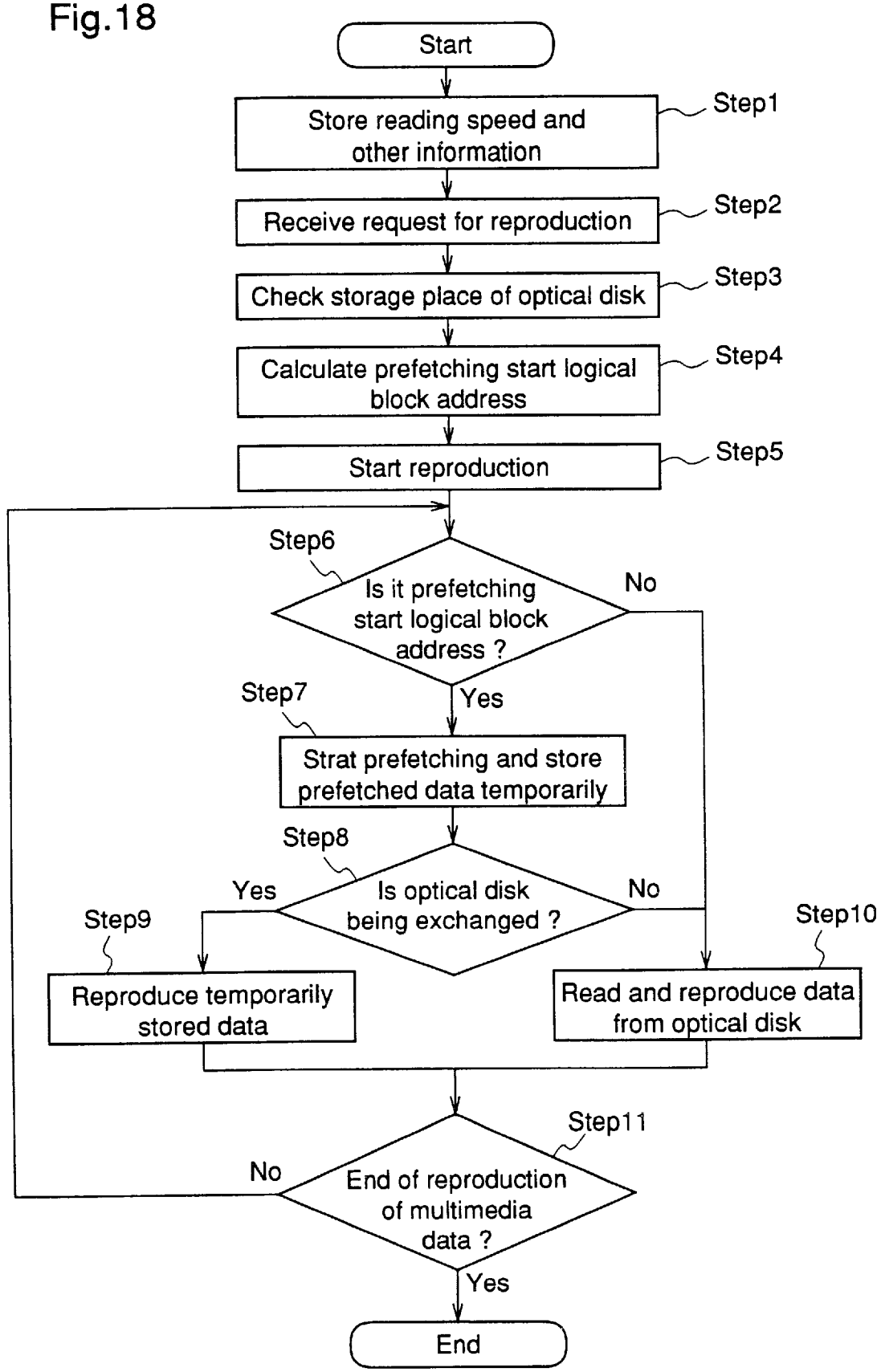
FIG. 18 is a flowchart illustrating the operation of a multimedia server system according to the sixth embodiment of the invention.

FIG. 17(a) shows a data structure in the data recording position storage means 104, and FIG. 17(b) shows specific data stored in the storage means 104. FIG. 18 is a flowchart for explaining the operation of the multimedia server system according to the sixth embodiment of the invention.

The optical disk library unit 500 contains four optical disks. Over two optical disks, MPEG1 multimedia data "multi01" of 8 MB, i.e., 4 MB for each disk, is recorded. On the other hand, over three optical disks, MPEG1 multimedia data "multi02" of 12 MB, i.e., 4 MB for each disk, is recorded. The storage positions of these optical disks in the library unit 500 and the recording positions of these multimedia data on the optical disks are as shown in FIG. 17(b). The optical disk library unit 500 takes eight seconds to exchange the optical disks. The performance of the optical disk drive contained in the optical disk library unit 500 is as follows: The maximum seek time is 200 ms, the maximum rotation waiting time is 30 ms, and the minimum reading speed: 500 KBytes/sec. The network in the multimedia server system is constructed by an ethernet having a maximum transmission speed of 10 Mbps (megabits per second). Two clients are connected to the server system through the network. The reproduction bit rate of MPEG 1 is 1.5 Mbps (about 187 KBytes/sec). The logical block size of each optical disk is 512 bytes.

Hereinafter, the operation of the multimedia server system according to this sixth embodiment will be described using the flowchart shown in FIG. 18.

Initially, in step 1, by the control means 102, the minimum reading speed of the optical disk drive, 500 KBytes/sec, is stored in the reading speed storage means 113, the MPEG 1 reproduction bit rate, 1.5 Mbps (about 187 KBytes/sec), is stored in the reproduction speed storage means 114, and the optical disk exchange time, eight seconds, is stored in the optical disk exchange time storage means 109.

Next, in step 2, the control means 102 receives a request for reproduction of multimedia data "multi01" from the client 700, through the network 650 and the data transmitting and receiving means 103.

In step 3, from the contents of the data recording position storage means 104 shown in FIG. 17(b), the control means 102 finds that the multimedia data "multi01" requested by the client 700 is recorded over the optical disks "disk#1" and "disk#3", and these optical disks are respectively stored in slots #10 and #12 of the storage shelf 502 in the optical disk library unit 500.

In step 4, the control means 102 performs the following calculations.

Initially, the control means 102 calculates the amount of multimedia data to be reproduced during the disk exchange time, as the number of logical blocks on the optical disk.

the number of logical blocks required for reproduction (blocks)= reproduction speed (Bytes/sec) * disk exchange time (sec)/ logical block size (Bytes/block)=(187 * 1024) * 8/512=2992 (blocks)

Next, the control means 102 calculates the prefetching speed of data that can be prefetched in parallel with reading and reproduction, as the number of logical blocks per a unit time. That is, the prefetching speed is a difference between the reading speed and the reproduction speed. Since the minimum reading speed of the optical disk drive 503 is 500 KBytes/sec and the required reproduction speed of MPEG1 is 1.5 Mbps (187 KByte/sec), the number of prefetchable logical blocks per a unit time (blocks/ sec)=(reading speed−reproduction speed) (Bytes/sec)/logical block size (Bytes/block)=(500−187) * 1024/512=626 (blocks/ sec)

Next, on the basis of the results of the above-mentioned calculations, a reading time of multimedia data required for reproduction during exchange of the optical disks is obtained.

prefetching time (sec)=the number of logical blocks required for reproduction (blocks)/the number of prefetchable logical blocks per a unit time (blocks/sec)=2992/626=4.77 (sec)

From this result, the number of logical blocks to be prefetched is obtained.

The number of logical blocks to be prefetched (blocks)=reading speed (Bytes/sec) * prefetching time (sec)/logical block size (Bytes/block)=500 * 1024 * 4.77/512=4770 (blocks)

On the basis of this result, a prefetching start logical block address is obtained.

prefetching start logical block address=the final recording position of data recorded in the optical disk "disk#1"−the number of logical blocks to be prefetched+1=8191−4770+1=3422

In step 5, the control means 102 controls the conveyer 504 in the library unit 500 by the library control means 101 so that the optical disk "disk#1" stored in the slot #10 is taken out of the storage shelf 502 and mounted in the optical disk drive 503. The control means 102 transmits data read from the optical disk "disk#1" mounted in the optical disk drive 503, through the data transmitting and receiving means 103 in the server unit 100 and the network 650, to the data transmitting and receiving means 704 in the client 700. In the client 700, the compressed data are expanded by the MPEG decoder of the data reproducing means 707 and displayed on the display unit 703.

In step 6, the control means 102 judges whether or not the reading position of the multimedia data "multi01" reaches the prefetching start logical block. When the reading position does not reach the logical block, step 10 is executed to continue reading and reproduction and, after judging whether the reproduction is ended in step 11, the control means 102 returns to step 6. Thereafter, until the control means 102 judges that the prefetching start recording position is reached, steps 6 to 10 and step 11 are repeated, and reading and reproduction of multimedia data from the optical disk are continued.

When the control means 102 judges in step 6 that the prefetching start position is reached, the control means 102 proceeds to step 7 wherein prefetching of data is started from the prefetching start logical block. The prefetched data are stored in the temporary storage means 111.

When the prefetching in step 7 is ended, the control means 102 starts exchange of optical disks. The optical disk "disk#3" is mounted in the drive in the same manner as described for step 5. On the other hand, in step 8, the control means 102 judges whether the optical disk is in the process of being exchanged. When the optical disk is in the process of being exchanged, the control means 102 proceeds to step 9 wherein the data transmitting and receiving means 103 transmits the data stored in the temporary storage means 111, through the network 650, to the client 700. In the client 700, the transmitted data are reproduced.

The control means 102 confirms that all the data stored in the temporary storage means 111 are transmitted. Then, in step 10, the control means 102 instructs the library control means 101 and the data transmitting and receiving means 103 to start reading and transmission of multimedia data "multi01" from the optical disk "disk#3". Thereafter, the respective steps mentioned above are repeated until the control means 102 judges in step 11 that the reproduced is ended.

As described above, in the multimedia server system according to the sixth embodiment of the invention, when multimedia data recorded over plural optical disks is reproduced, the control means calculates the data position from which prefetching is started so that a portion of the multimedia data equivalent to the optical disk exchange time is stored in the temporary storage means, and prefetching and temporary storage are performed while performing reading and reproduction of multimedia data. Therefore, the data stored in the temporary storage means is transmitted during exchange of the optical disks, the reproduction of the multimedia data is not interrupted, that is, continuous reproduction is realized.

[Embodiment 7]

A multimedia server system according to a seventh embodiment of the present invention is identical to the system according to the sixth embodiment in that data equivalent to the time required for exchange of disks is temporarily stored, and the server system according to this seventh embodiment can deal with a request for jumping reproduction.

The structure of the multimedia server system and the recording state of multimedia data according to this seventh embodiment are identical to those mentioned for the sixth embodiment. The operation of the server system when multimedia data are reproduced in response to a request from the client is identical to that according to the sixth embodiment. However, only when the client outputs a request for jumping reproduction and a logical block address to which the jumping reproduction is given is positioned after a prefetching start logical block address calculated in advance, the operation of the server system differs from that mentioned for the sixth embodiment.

Figure 19:
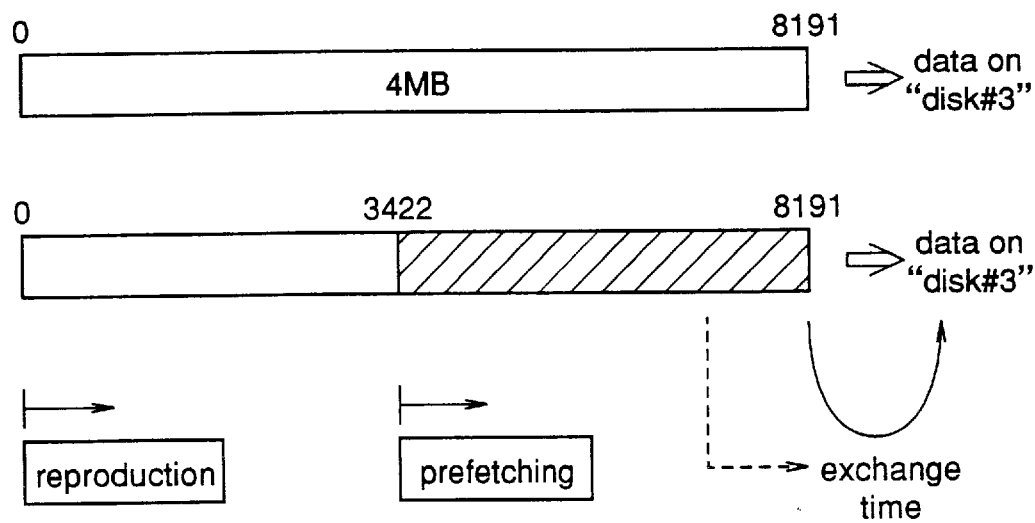
FIGS. 19(a) and 19(b) are diagrams for explaining jumping reproduction according to a seventh embodiment of the invention.
Figure 19:
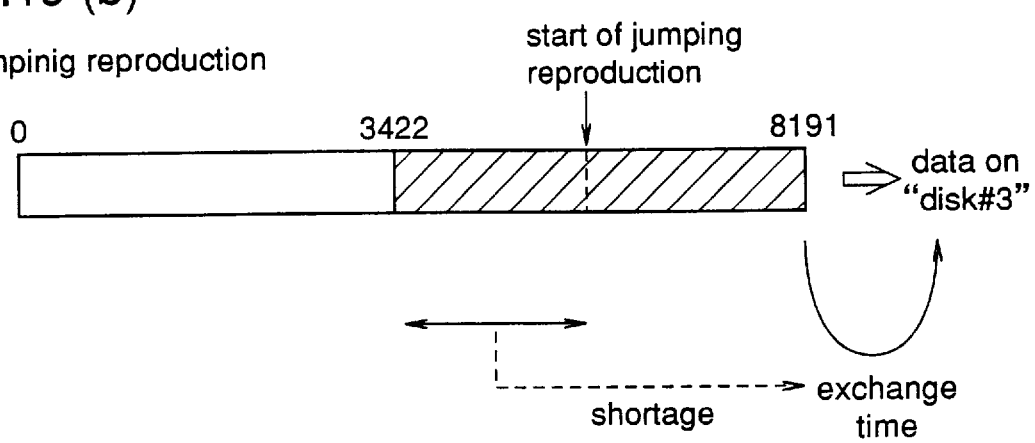

FIGS. 19(a) and 19(b) are diagrams for explaining problems in the jumping reproduction. As shown in FIG. 19(a), in ordinary reproduction in the server system according to the sixth or seventh embodiment of the invention, when multimedia data recorded over plural disks is reproduced, a portion of the multimedia data equivalent to the disk exchange time is prefetched and stored in the temporary storage means. As described for the sixth embodiment, since this data is read and reproduced during the disk exchange time, continuous reproduction is realized. FIG. 19(b) shows a case where a request for jumping reproduction is positioned after the prefetching start position. In this case, if the prefetching and temporary storage are performed from the designated reproduction start position, the amount of the multimedia data stored in the temporary storage means is insufficient when the disk "disk#1" is exchanged for the next disk "disk#3", resulting in an interruption in the reproduction due to the exchange of the disks.

This problem is solved in the multimedia server system according to this seventh embodiment of the invention. That is, in this system, multimedia data equivalent to the shortage of data in the temporary storage means is prefetched and stored temporarily and, thereafter, reading, temporary storage, and reproduction are performed from the designated position, whereby unwanted interruption in the reproduction due to exchange of the disks is avoided.

Hereinafter, the operation of the multimedia server system according to this seventh embodiment will be described for a case where a request for jumping reproduction from the client 700 designates, as a recording position on the optical disk, a position after the prefetching start position which is calculated in advance. It is assumed that the prefetching start position corresponds to a logical block address 3422, and a logical block address 4000 is designated as the reproduction start position.

When the control means 102 receives a request for jumping reproduction designating a starting logical block address 4000 from the client 700 through the data transmitting and receiving means 103, the control means 102 compares the reproduction starting logical block address with the prefetching starting logical block address calculated according to the sixth embodiment, and finds that the reproduction starting logical block address 4000 is positioned after the prefetching starting logical block address 3422.

Then, the control means 102 prefetches multimedia data between the prefetching starting logical block address 3422 and the reproduction starting logical block address 4000, and stores the prefetched data in the temporary storage means 111.

When the prefetching is ended, the control means 102 starts reproduction of the multimedia data requested by the client 700, from the logical block address 4000. That is, although the multimedia data between the logical block addresses 3422 and 4000 is read in the temporary storage means and read out from the temporary storage means, this data is not reproduced in this stage. When reading of data after the requested address 4000 is started, the data between the logical block addresses 3422 and 4000 is transmitted and reproduced. The operation of the server system according to the seventh embodiment other than the above-mentioned operation is identical to the operation of the server system according to the sixth embodiment.

As described above, in the multimedia server system according to the seventh embodiment of the invention, when a jumping reproduction is requested after the prefetching starting logical block address, multimedia data between the prefetching starting logical block address and the reproduction requested logical block address is stored in the temporary storage means. Therefore, shortage of the prefetched multimedia data due to the request of jumping reproduction is avoided, whereby unwanted interruption in the reproduction of multimedia data is avoided even when the jumping reproduction is requested.

[Embodiment 8]

In a multimedia server system according to an eighth embodiment of the invention, when a request for reproduction of multimedia data from a client is given to an optical disk which is in the process of reproduction, the request is refused to avoid interruption in reproduction.

In this eighth embodiment, the structure of the multimedia server system, the hardware structures of the server and the client, the structure of the client, and the structure of the library unit are the same as those according to the first embodiment of the invention.

Figure 20:
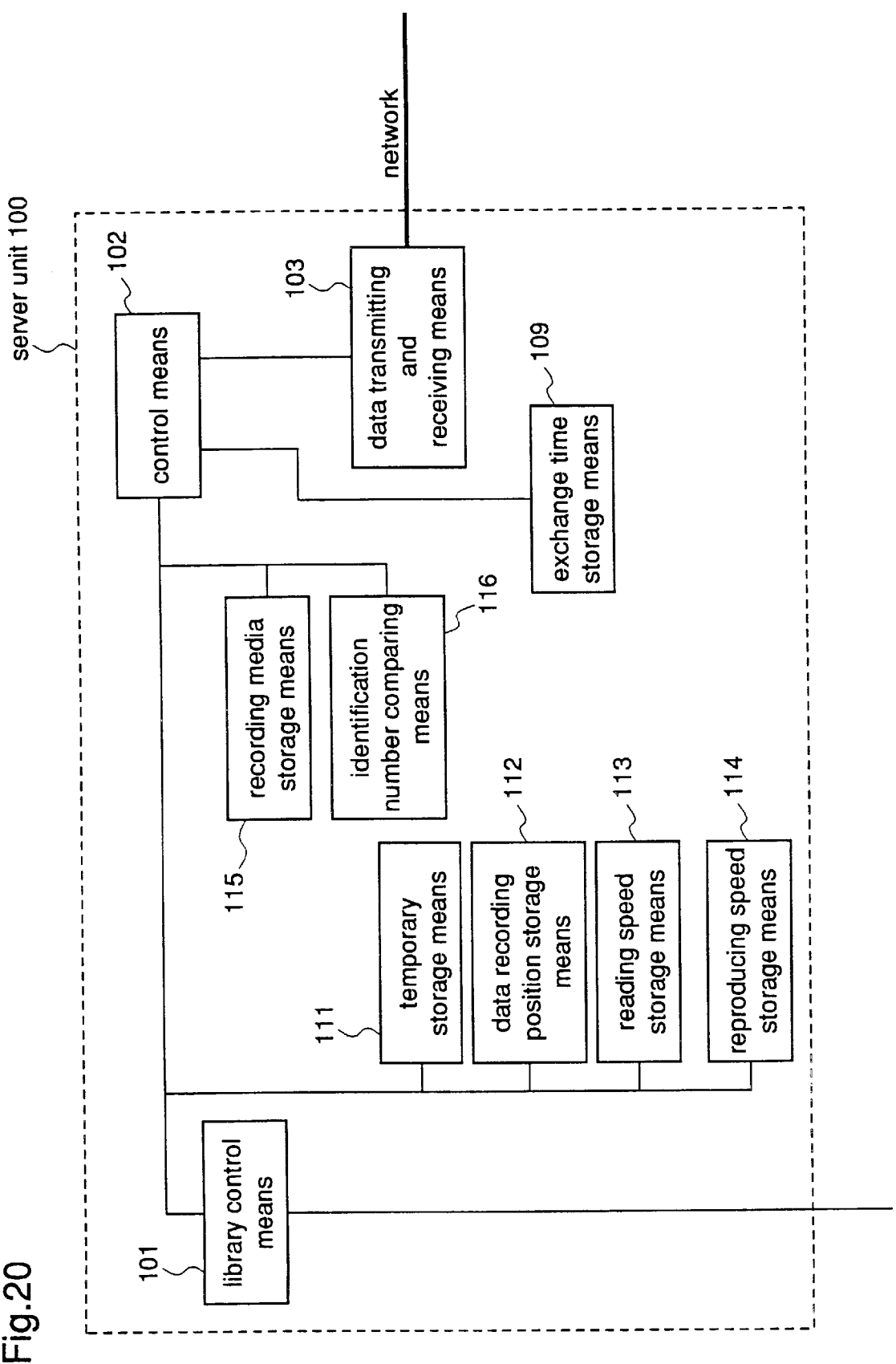
FIG. 20 is a block diagram illustrating a server unit according to an eighth embodiment of the invention.

FIG. 20 is a block diagram illustrating a server unit 100 according to the eighth embodiment of the invention. In FIG. 20, reference numeral 115 designates a recording media storage means for storing correspondences between plural multimedia data and identification numbers of optical disks in which the multimedia data are recorded. Reference numeral 116 designates an identification number comparing means for comparing the identification numbers of the optical disks. The same reference numerals as those shown in FIG. 16 designate the same or corresponding parts. FIG. 21(a) shows a data structure in the recording media storage means 115, and FIG. 21(b) shows specific data stored in the storage means 115.

In the server system so constituted, as in the sixth embodiment of the invention, two multimedia data "multi01" and "multi02" are recorded in optical disks contained in the library unit 500, more specifically, the former is recorded over two optical disks "disk#1" and "disk#3", and the latter is recorded over three optical disks "disk#2", "disk#3", and "disk#4". The recording media storage means 115 contains data shown in FIG. 21(b).

The operation of the server system according to this eighth embodiment will be described on the assumption that two clients 700 and 701 are connected to the network, reproduction of the multimedia data "multi01" has already started in the client 700, and the client 701 outputs a request for reproduction of the multimedia data "multi02".

The control means 102 checks the contents of the recording media storage means 115 and finds that the requested data "multi02" is recorded over three optical disks, identification numbers of which are "disk#2", "disk#3", and disk#4", respectively, and that the data "multi01", for which reproduction has already started, is recorded over two optical disks, identification numbers of which are "disk#1" and "disk#3", respectively. Then, the control means 102 compares the identification numbers of the optical disks stored in the recording media storage means 115 with each other by the identification number comparing means 116. The identification number comparing means 116 informs, to the control means 102, that one of the optical disks having the multimedia data "multi02" has the same identification number as "disk#3" of the optical disk having the multimedia data "multi01" which is now in the process of being reproduced. Then, the control means 102 refuses the request for reproduction of "multi02" from the client 701.

In the server system according to the eighth embodiment, when the request from the client is not refused in the above-mentioned stage, the same operation as described for the sixth embodiment is performed to reproduce the requested multimedia data.

As described above, according to the eighth embodiment of the invention, the server system is equipped with the recording media storage means that stores identification numbers of optical disks in which plural multimedia data are recorded, for each multimedia data, and the identification number comparing means. The identification number comparing means compares identification numbers of optical disks having multimedia data which is in the process of reproduction with identification numbers of optical disks having newly requested multimedia data. When the new request is given to the optical disk in the process of reproduction, the request is refused because reading of plural multimedia data from the same disk exceeds the performance of the optical disk drive. As already described for the prior art system, in an optical disk drive that is inferior in performance than a magnetic disk drive, when plural multimedia data are reproduced from the same disk, reading of the data delays, adversely affecting the reproduction of the multimedia data. However, since the server system according to this eighth embodiment inhibits such a reproduction, undesired interruption in reproduction is avoided.

[Embodiment 9]

A multimedia server system according to a ninth embodiment of the invention checks requests for reproduction of multimedia data from clients and refuses to accept the request exceeding the reproducibility of the system, whereby unwanted interruption in the reproduction is avoided.

In this ninth embodiment, the structure of the multimedia server system, the hardware structures of the server and the client, the structure of the client, and the structure of the library unit are identical to those according to the first embodiment of the invention.

Figure 22:
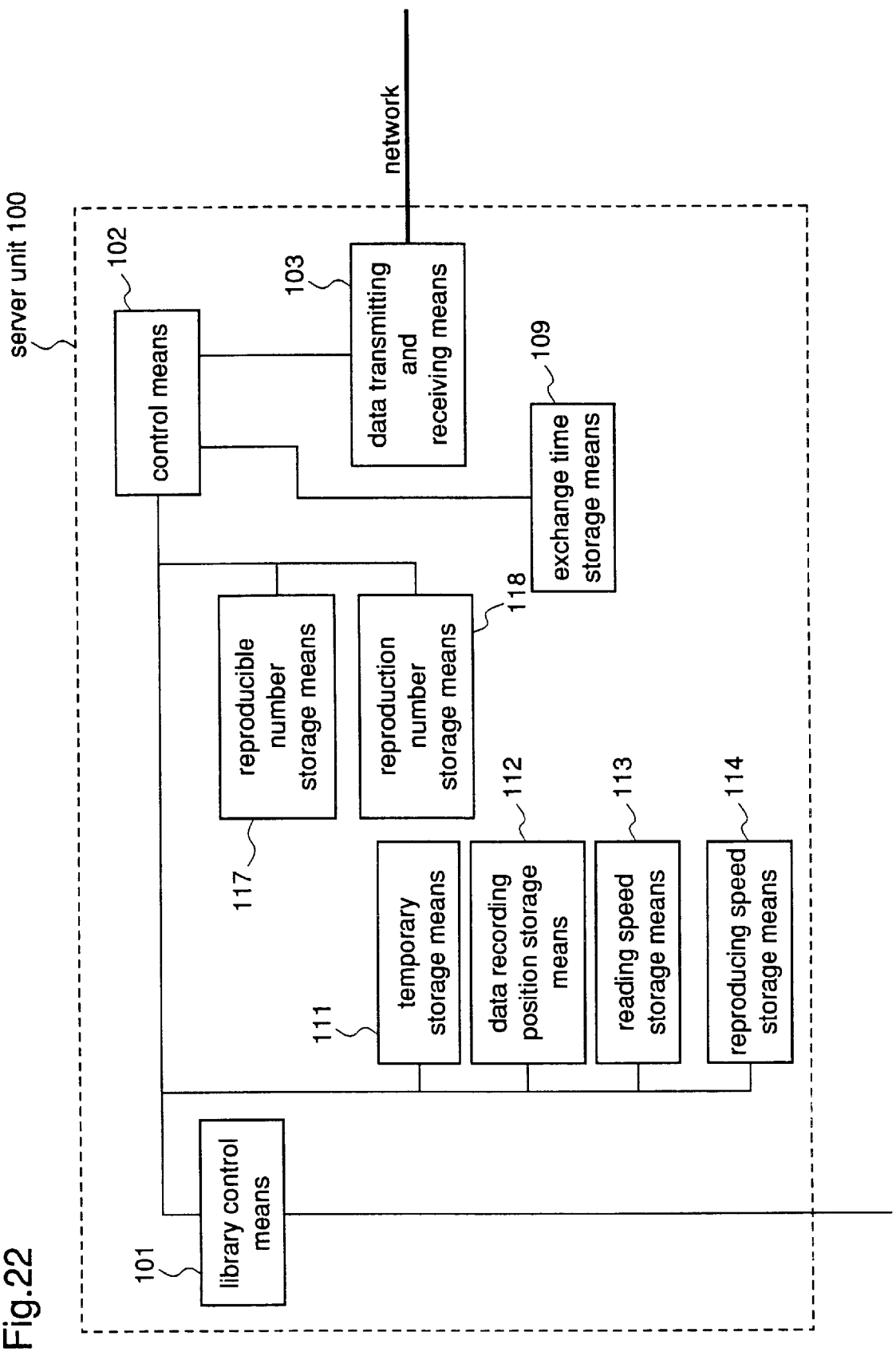
FIG. 22 is a block diagram illustrating a server unit according to a ninth embodiment of the invention.

FIG. 22 is a block diagram illustrating a server unit 100 according to the ninth embodiment of the invention. In FIG. 22, reference numeral 117 designates a reproducible number storage means storing the number of multimedia data that can be reproduced simultaneously from each optical disk in the optical disk library unit 500. Reference numeral 118 designates a reproduction number storage means for storing a reproduction number which is the sum of the number of multimedia data which is/are in the process of being reproduced and the number of multimedia data which is/are to be reproduced. In FIG. 22, the same reference numerals as those shown in FIG. 16 designate the same or corresponding parts. FIG. 23(*a*) shows a data structure in the reproduction number storage means 118, and FIG. 23(*b*) shows specific data of the content stored in the storage means 118.

It is assumed that the number of multimedia data that can be read from a single optical disk is 2, so that "2" is stored in the reproducible number storage means 117. Three clients 700, 701, and 702 are connected to the server system through the network, and multimedia data "multi03" and "multi04" are already reproduced by the clients 700 and 701, respectively. The multimedia data "multi03" is recorded over two optical disks, identification numbers of which are "disk#1" and "disk#2", respectively, and the multimedia data "multi04" is recorded over two optical disks, identification numbers of which are "disk#2" and "disk#3", respectively. The reproduction number storage means 118 stores data shown in FIG. 23(*b*).

The operation of the server system according to this ninth embodiment will be described for a case where the client 702 requests for reproduction of multimedia data "multi06" which is recorded over two optical disks, identification numbers of which are "disk#1" and "disk#2".

When the request for reproduction of "multi06" from the client 702 is transmitted through the network to the server unit 100, the control means 102 receives the request through the data transmitting and receiving means 103.

The control means 102 checks the contents of the reproducible number storage means 117 and finds that the number of multimedia data that can be reproduced simultaneously from each optical disk is 2. Then, from the contents of the reproduction number storage means 118, the control means 102 finds that the reproduction number of the optical disk "disk#1" is 1 and the reproduction number of the optical disk "disk#2" is 2, which disks have the data "multi06".

Next, the control means 102 adds 1 to the reproduction number of each optical disk having the data "multi06". As a result, the reproduction number of the optical disk "disk#1" becomes 2, and the reproduction number of the optical disk "disk#2" becomes 3. Then, the control means 102 compares the result for each optical disk with the simultaneously reproducible number of multimedia data, i.e., 2, stored in the reproducible number storage means 117. Since the reproduction number of the optical disk "disk#2", i.e., 3, is larger than 2, the control means 102 refuses the request for reproduction of "multi06" from the client 702.

In the server system according to this ninth embodiment, when the request from the client is not refused in the above-mentioned stage, the same operation as described for the sixth embodiment is performed to reproduce the requested multimedia data.

As described above, the multimedia server system according to this ninth embodiment is equipped with the reproducible number storage means that stores the number of multimedia data which can be reproduced simultaneously from each optical disk, and the reproduction number storage means that stores the reproduction number which is the sum of the number of multimedia data being reproduced now and the number of multimedia data to be reproduced later. When the server system receives a request for reproduction of multimedia data, 1 is added to the reproduction number of each optical disk having the requested multimedia data and judges whether the result of the addition exceeds the number of the reproducible multimedia data. When it exceeds that number of the optical disk, the request is refused. Therefore, unwanted interruption in reproduction due to reproduction exceeding the ability of the optical disk drive is avoided.

[Embodiment 10]

A tenth embodiment of the present invention relates to an apparatus for continuously reproducing multimedia data recorded over plural disks.

Figure 24:
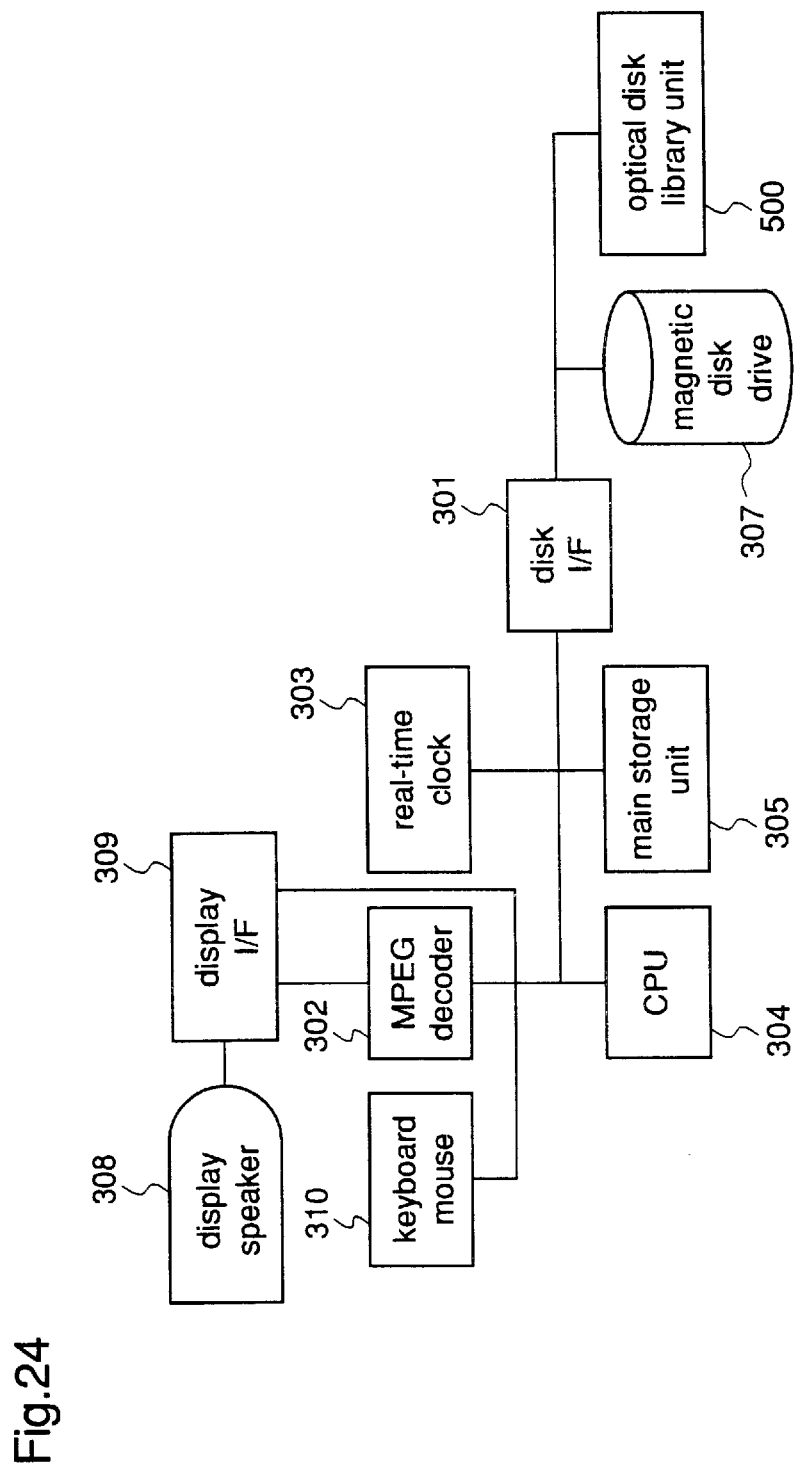
FIG. 24 is a block diagram illustrating a hardware structure of a multimedia data reproducing apparatus according to tenth and eleventh embodiments of the invention.

FIG. 24 is a block diagram illustrating a hardware structure of the reproduction apparatus according to the tenth embodiment of the invention. In FIG. 24, a disk I/F 301, a real-time clock 303, a CPU 304, a main storage unit 305, a magnetic disk unit 307, and an optical disk library unit 500 are identical to those shown in FIG. 2(*a*) (206, 202, 204, 205, 207, and 500, respectively). Further, an MPEG decoder 302, a display speaker 308, a display I/F 309, and a keyboard or mouse 310 are identical to those shown in FIG. 2(*b*) (211, 208, 209, and 210, respectively).

Figure 25:
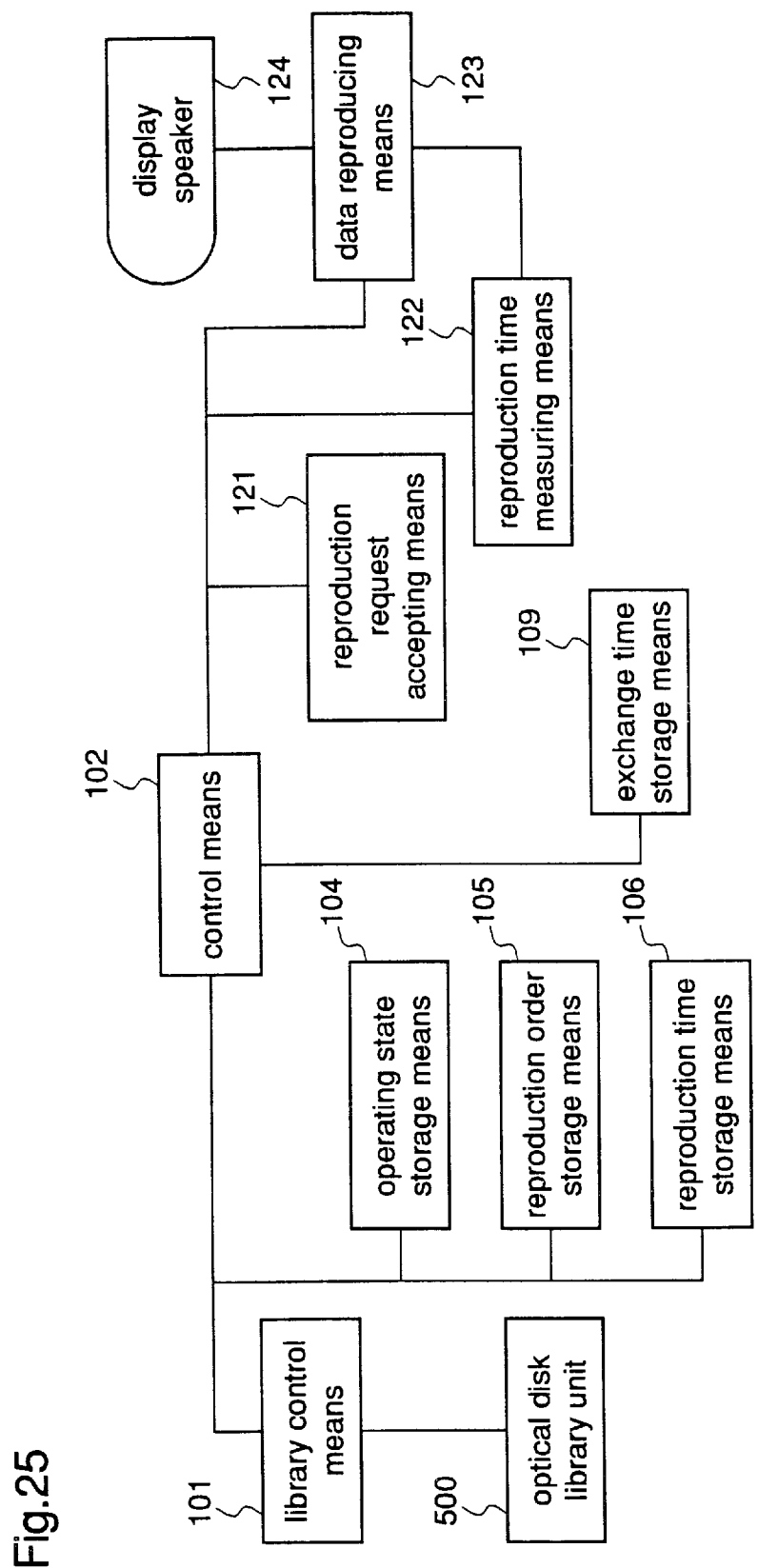
FIG. 25 is a block diagram illustrating the multimedia data reproducing apparatus according to the tenth embodiment of the invention.

FIG. 25 is a block diagram of the reproduction apparatus viewed from the function. In FIG. 25, a library control means 101, a control means 102, an operating state storage means 104, a reproduction order storage means 105, a reproduction time storage means 106, and an exchange time storage means 109 are identical to those shown in FIG. 3 according to the first embodiment. Further, a reproduction request accepting means 121, a reproduction time measuring means 122, a data reproducing means 123, and a display 124 are identical to those shown in FIG. 4 (706, 705, 707, and 703, respectively) according to the first embodiment. The correspondences between the hardware constituents shown in FIG. 24 and the functional constituents shown in FIG. 25 are the same as those mentioned for the first embodiment.

The operation of the reproduction apparatus according to this tenth embodiment is identical to the operation of the server system according to the first embodiment except the operation of reproducing multimedia data in step 10 of the flowchart shown in FIG. 6.

In step 10, the control means 102 transmits multimedia data read from the optical disk "disk#0" mounted in the optical disk drive "Drive0" to the data reproducing means 123, wherein the MPEG compressed data is expanded by the MPEG decoder and displayed on the display 124.

In the operation, the request for reproduction accepted by the reproduction request accepting means 121 and the result from the reproduction time measuring means 122 are transmitted directly to the control means 102, not through the data transmitting and receiving means and the network.

As described above, also in the multimedia reproduction apparatus according to this tenth embodiment, as in the server-client system according to the first embodiment, multimedia data recorded over plural optical disks can be reproduced without interruption due to exchange of the disks.

The apparatus may be provided with, in place of the operating state storage means, a reservation data storage means and a clock as in the second embodiment of the invention.

When the structure according to this tenth embodiment is applied to the server unit in the multimedia server system according to the first or second embodiment, reproduction of multimedia data is realized in the server unit. In this case, the result of reproduction in the client can be confirmed by the server.

[Embodiment 11]

An eleventh embodiment of the present invention relates to an apparatus for continuously reproducing multimedia data recorded over plural disks.

The hardware structure of the reproduction apparatus according to this eleventh embodiment is identical to that shown in FIG. 24 according to the tenth embodiment.

Figure 26:
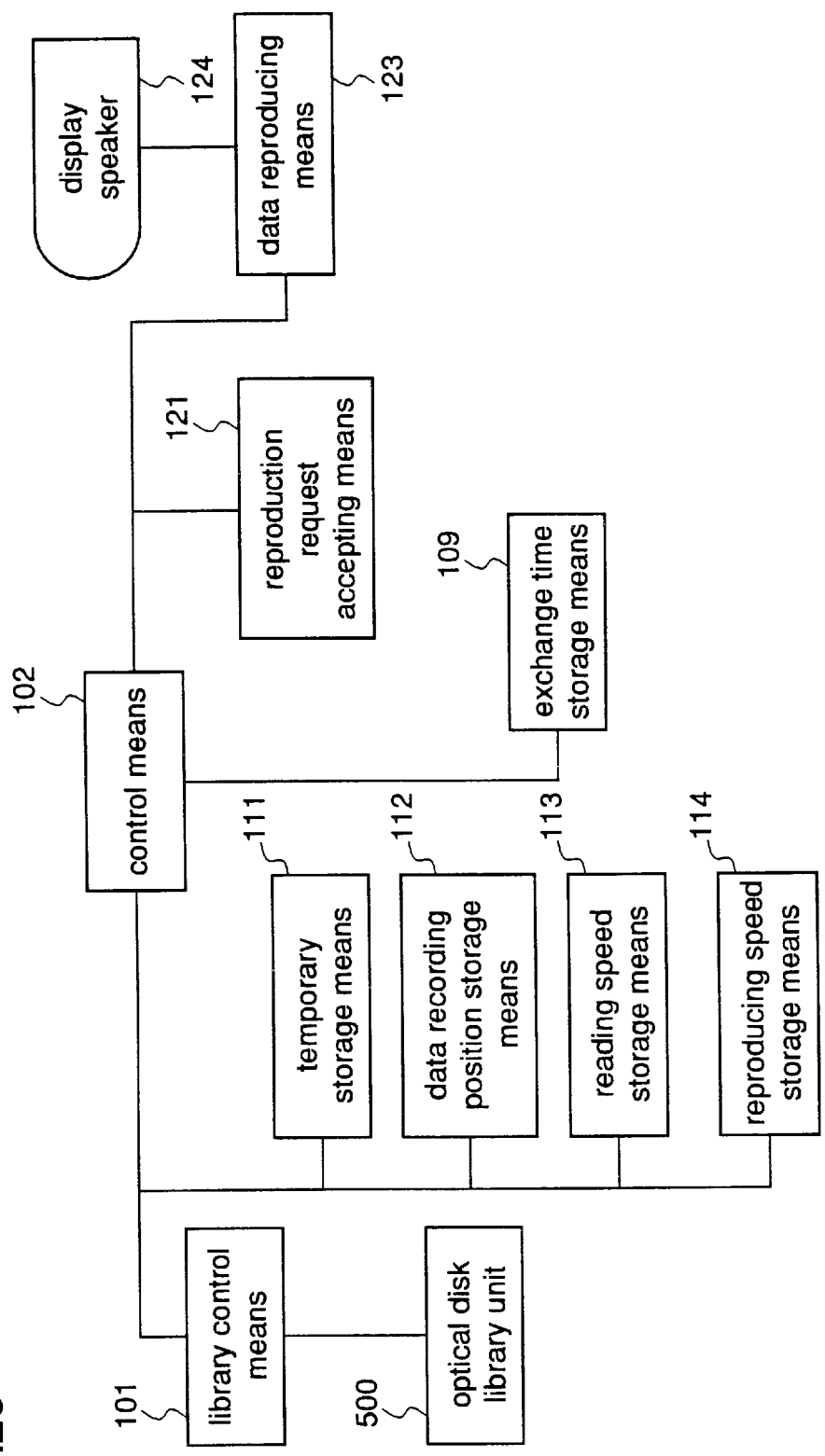
FIG. 26 is a block diagram illustrating the multimedia data reproducing apparatus according to the eleventh embodiment of the invention.
Figure 27:
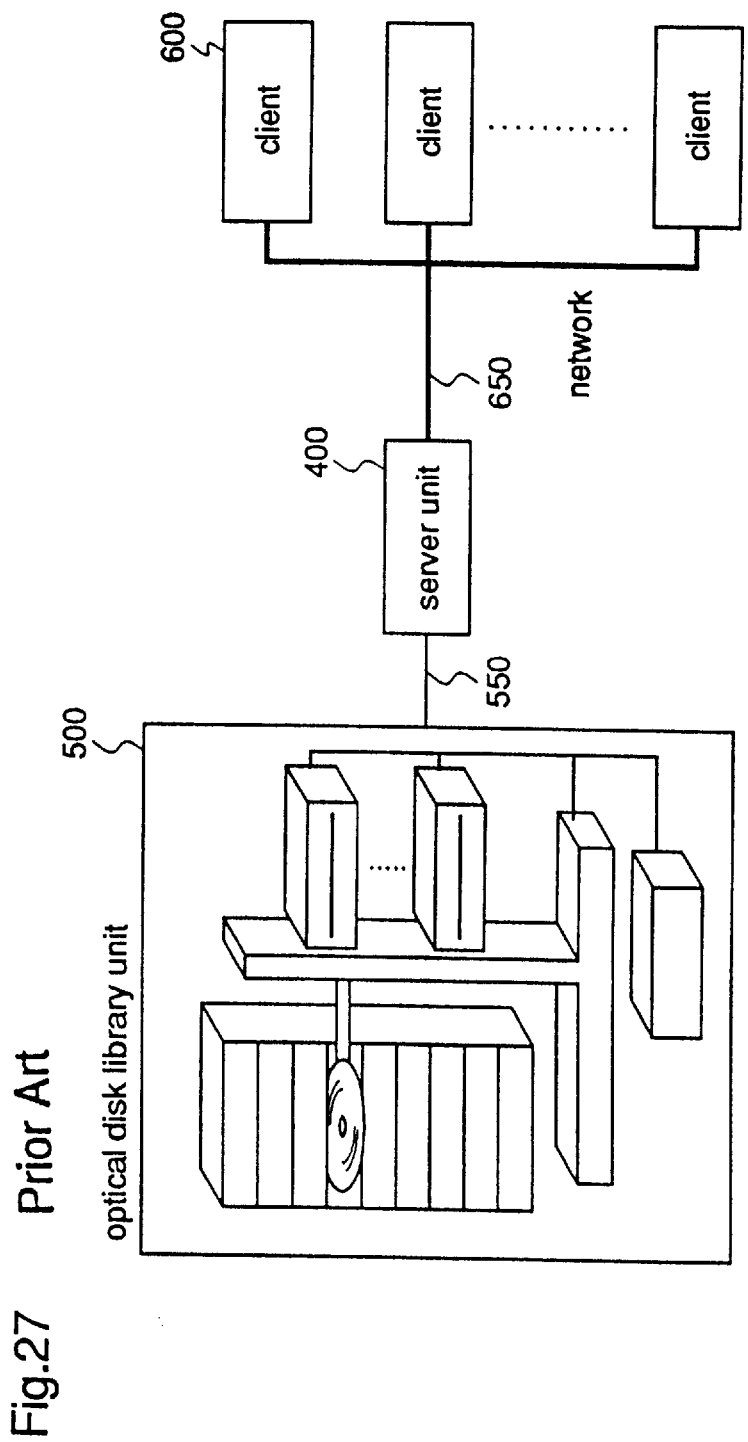
FIG. 27 is a block diagram illustrating a multimedia server system according to the prior art.

FIG. 26 is a block diagram of the reproduction apparatus viewed from the functions. In FIG. 26, a library control means 101, a control means 102, and a disk exchange time storage means 109 are identical to those shown in FIG. 3 according to the first embodiment. A temporary storage means 111, a data recording position storage means 112, a reading speed storage means 113, and a reproducing speed storage means 114 are identical to those shown in FIG. 16 according to the sixth embodiment. A reproduction request accepting means 121, a data reproducing means 123, and a display 124 are identical to those shown in FIG. 4 (706, 707, and 703, respectively) according to the first embodiment. The correspondences between the hardware constituents shown in FIG. 24 and the functional constituents shown in FIG. 26 are the same as those mentioned for the first embodiment.

The operation of the reproduction apparatus according to this eleventh embodiment is identical to the operation of the server system according to the sixth embodiment except steps 5, 9, and 10 for reproducing multimedia data, in the flowchart shown in FIG. 18. More specifically, in this eleventh embodiment, the control means 102 transmits data read from the optical disk or the temporary storage means 111 to the data reproducing means 123, wherein the MPEG compressed data is expanded by the MPEG decoder and displayed on the display 123.

In the operation, the request for reproduction accepted by the reproduction request accepting means 121 and the result from the reproduction time measuring means 122 are transmitted directly to the control means 102, not through the data transmitting and receiving means and the network.

As described above, also in the multimedia reproduction apparatus according to this eleventh embodiment, as in the server-client system according to the sixth embodiment, multimedia data recorded over plural optical disks can be reproduced without interruption due to exchange of the disks.

While the structure of the apparatus according to this eleventh embodiment is based on the server system according to the sixth embodiment, it may be based on the server system according to the third or fourth embodiment to realize a continuous reproduction by reading and reproducing data temporarily stored during exchange of disks.

In the multimedia server system according to any of embodiments 3 to 6, when the structure according to this eleventh embodiment is applied to the server unit, reproduction of multimedia data in the server unit is possible. In this case, the result of reproduction in the client can be confirmed by the server.

What is claimed is:

1. A method for reproducing multimedia data in response to plural requests for reproduction using an optical disk library unit having at least one optical disk drive, wherein, when a new request for reproduction of multimedia data is given to the optical disk library unit during reproduction of multimedia data recorded over plural optical disks, this new request for reproduction is refused if an optical disk having the multimedia data requested by the new request is the same as one of the plural optical disks having the multimedia data being reproduced.

2. A method for reproducing multimedia data in response to plural requests for reproduction using an optical disk library unit having at least one optical disk drive, the method comprising steps of:

storing an upper limit of the number of multimedia data reproducible simultaneously from a single optical disk;

storing a reproduction number for each optical disk contained in the optical disk library unit, which reproduction number is the sum of the number of multimedia data being reproduced from the optical disk and the number of multimedia data to be reproduced later from the optical disk; and when a request for reproduction of multimedia data is given to the optical disk library unit, refusing this request if the number obtained by adding 1 to the reproduction number of the optical disk having the requested multimedia data exceeds the upper limit number.

3. A multimedia server system comprising an optical disk library unit wherein multimedia data recorded in plural optical disks are processed with at least one optical disk drive, and a server for distributing the multimedia data recorded in the optical disks to plural clients, said system comprising:

a recording media storage means for storing, for each multimedia data, an identification data that identifies an optical disk in which the multimedia data is recorded;

an identification data comparing means for comparing the identification data of the plural optical disks with each other and outputting a result; and a control means for accepting a request for reproduction of multimedia data from the client if the result of the comparison by the identification data comparing means indicates that the identification data of the plural optical disks is different and for refusing a request for reproduction of multimedia data from the client if the result of the comparison by the identification data comparing means indicates that the identification data of the plural optical disks is the same.

4. A multimedia server system comprising an optical disk library unit wherein multimedia data recorded in plural optical disks are processed with at least one optical disk drive, and a server for distributing the multimedia data recorded in the optical disks to plural clients, said system comprising:

a reproducible data number storage means for storing an upper limit of the number of multimedia data reproducible simultaneously from each optical disk;

a reproduction number storage means for storing a reproduction number of each optical disk, which reproduction number is the sum of the number of multimedia data being reproduced from the optical disk and the number of multimedia data to be reproduced later from the optical disk; and a control means for accepting a request for reproduction of multimedia data from the client if the contents of the reproducible data number storage means is greater than or equal to the reproduction number stored in the reproduction storage means and for refusing a request for reproduction of the multimedia data from the client if the contests the reproducible data number storage means is less than the reproduction number stored in the reproduction storage means.

* * * * *